United States Patent
Mahmoud

(10) Patent No.: US 10,590,750 B2
(45) Date of Patent: Mar. 17, 2020

(54) METHOD OF ACIDIZING A GEOLOGICAL FORMATION AND METHOD OF DETERMINING AN EFFECTIVENESS OF ACIDIZING

(71) Applicant: KING FAHD UNIVERSITY OF PETROLEUM AND MINERALS, Dhahran (SA)

(72) Inventor: Mohamed Ahmed Nasr El-Din Mahmoud, Dhahran (SA)

(73) Assignee: King Fahd University of Petroleum and Minerals, Dhahran (SA)

(*) Notice: Subject to any disclaimer, the term of this patent is extended or adjusted under 35 U.S.C. 154(b) by 98 days.

(21) Appl. No.: 15/913,960

(22) Filed: Mar. 7, 2018

(65) Prior Publication Data

US 2019/0277122 A1    Sep. 12, 2019

(51) Int. Cl.
| | | |
|---|---|---|
| *E21B 43/26* | (2006.01) | |
| *C09K 8/74* | (2006.01) | |
| *G01V 3/38* | (2006.01) | |
| *G01V 3/32* | (2006.01) | |
| *G01V 3/34* | (2006.01) | |
| *C09K 8/70* | (2006.01) | |

(52) U.S. Cl.
CPC .......... *E21B 43/26* (2013.01); *C09K 8/70* (2013.01); *C09K 8/74* (2013.01); *G01V 3/32* (2013.01); *G01V 3/34* (2013.01); *G01V 3/38* (2013.01)

(58) Field of Classification Search
CPC ........ E21B 43/26; E21B 43/25; E21B 49/086; E21B 41/0035; E21B 2049/085; E21B 2049/087; C09K 8/70; C09K 8/74; G01V 3/32; G01V 3/34; G01V 3/38
See application file for complete search history.

(56) References Cited

U.S. PATENT DOCUMENTS

| | | | |
|---|---|---|---|
| 3,734,186 A * | 5/1973 | Williams ................. | C09K 8/78 166/282 |
| 4,022,276 A | 5/1977 | Dreher et al. | |
| 9,464,512 B2 * | 10/2016 | Kalia ...................... | E21B 43/16 |
| 10,378,325 B2 * | 8/2019 | Panga ..................... | E21B 43/26 |
| 2015/0308251 A1 * | 10/2015 | Parker .................... | E21B 43/25 166/248 |
| 2017/0130122 A1 * | 5/2017 | Reyes ..................... | E21B 43/28 |
| 2017/0138190 A1 * | 5/2017 | Elkatatny .............. | E21B 49/086 |
| 2018/0112506 A1 * | 4/2018 | Martysevich .......... | E21B 43/26 |

FOREIGN PATENT DOCUMENTS

WO    WO 2016/014485 A1    1/2016

OTHER PUBLICATIONS

Yaser K. Duailej, et al., "Wormhole Characterization Using NMR", IPTC 2013: International Petroleum Technology Conference, Mar. 26, 2013, 1 page.

(Continued)

*Primary Examiner* — Yong-Suk Ro
(74) *Attorney, Agent, or Firm* — Oblon, McClelland, Maier & Neustadt, L.L.P.

(57) ABSTRACT

A method of acidizing a geological formation is provided. A method of determining an effectiveness of the acidizing with NMR spectroscopy is also provided. Various embodiments of the method of acidizing and the method of determining the effectiveness of the acidizing are specified.

20 Claims, 15 Drawing Sheets

(56) References Cited

OTHER PUBLICATIONS

Ning Qi, et al., "Optimum Fluid Injection Rate in Carbonate Acidizing Based on Acid Dissolution Morphology Analysis", Energy & Fuels, Oct. 31, 2017, 1 page.

Mohamed Mahmoud, "Determination of the optimum wormholing conditions in carbonate acidizing using NMR", Journal of Petroleum Science and Engineering, vol. 159, Oct. 6, 2017, pp. 952-969.

* cited by examiner

METHOD OF ACIDIZING A GEOLOGICAL FORMATION AND METHOD OF DETERMINING AN EFFECTIVENESS OF ACIDIZING

BACKGROUND OF THE INVENTION

Technical Field

The present invention relates to a method acidizing a geological formation and a method of determining an effectiveness of the acidizing with NMR spectroscopy.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Acidizing operations are common practices in oil and gas producing wells and water injection wells to remove damages that form as a result of drilling operations and to enhance the productivity/injectivity of the reservoir. Acids are used to create macro-pore channels (wormholes) that fluidly connect the undamaged regions in the reservoir to the wellbore. The created wormholes facilitate the flow of formation fluids (e.g. oil and/or gas) from the reservoir to the wellbore by increasing the effective wellbore radius. In addition, the wormholes enhance the injectivity of water in water injection wells.

The productivity enhancement after an acidizing operation is a function of the acid penetration radius from the wellbore. A total recovery of the well productivity after an acidizing operation requires an acid penetration radius of at least 3 meters from the wellbore in the case of wells that have not been affected by damage in near-wellbore zones [Muskat, M.: Physical Principles of Oil Production, McGraw-Hill Book Co. Inc., New York City (1947) 242]. To achieve this high level of acid penetration radius, the acid should be injected at the maximum possible injection rates. However, at high injection rates, the rate of acid consumption increases. The relation of the acid injection rate to the acid consumption rate is described by Damkholer number ($N_{Da}$), which is a ratio between the acid reaction rate to the acid injection rate as follows [Fredd, C. N. and Fogler H. S.: "The Influence of Chelating Agents on the Kinetics of Calcite Dissolution", J. Colloid Interface Sci., 204 (1), 1998, 187-197]:

$$N_{Da} = \frac{\tau D_e^{2/3} L}{Q}$$

where r is the rock tortuosity factor, $D_e$ is the effective diffusion coefficient, L is the core length, and Q is the acid injection rate. Additionally, the Peclet number is used to describe the acid injection rate to the acid consumption rate when the reaction is controlled by the mass transfer rate. The Peclet number is a ratio of the acid convection rate to the acid diffusion rate as follows [Gomaa, A. M., Mahmoud, M. A., and Nasr-El-Din, H. A., Laboratory Study of Diversion Using Polymer-Based In-Situ-Gelled Acids, SPE Production & Operations Journal 26(3), 2011, 278-290, doi:10.2118/132535-PA; incorporated herein by reference in its entirety]:

$$N_{pe} = \frac{vL}{D_l}$$

where v is the Darcy velocity, L is the rock sample length, and $D_l$ is the longitudinal dispersion coefficient.

A preferred injection rate in acidizing of carbonate formations is defined as the injection rate at which the wormholes are generated with the least amount of acid consumption. Wormholes are created to connect the reservoir to the wellbore by bypassing damages in order to enhance wellbore productivity by increasing the effective wellbore radius in the formation. Wang et al. [Wang, Y., Hill, A. D., and Schechter, R. S., The Optimum Injection Rate for Matrix Acidizing of Carbonate Formations. Paper presented at the SPE Annual Technical Conference and Exhibition, 1993, Houston, Tex. doi:10.2118/26578-MS] found that the preferred injection rate in acidizing of carbonate formations is a function of acid concentration and temperature. They revealed that the amount of the acid consumed to generate wormholes at preferred injection rates was lower for low concentration acid solutions compared to high concentration acid solutions. According to Wang et al., at the same injection rates, 1.2 grams of a high concentration acid solution (15 wt. % HCl acid) was used to generate wormholes in a carbonate formation, whereas the acid amount was around 0.59 grams for a low concentration acid solution (3.4 wt. % HCl acid).

During the acid reaction with the carbonate formations, the pressure drop in generated wormholes is considered to be zero. The pressure drop during the acid flow and wormhole creation can be expressed as follows [Daccord, G., Touboul, E., and Lenormand, R., Carbonate Acidizing: Toward a Quantitative Model of the Wormholing Phenomenon. SPE Production Engineering Journal 4(1), 1989, 63-68, doi:10.2118/16887-PA]:

$$p(t) = \frac{\mu Q}{k\pi r_o^2}[L - L_e(t)]$$

where p(t) is the pressure drop at time t, μ is the dynamic viscosity, Q is the acid injection rate, k is the rock sample permeability, $r_o$ is the rock sample radius, L is the rock sample length, and $L_e(t)$ is the wormhole length at time t. Approaching p(t) to zero is an indication of breakthrough of the wormholes. In addition, computed tomography (CT) has been used extensively to characterize and describe wormhole propagation in carbonate formations using different stimulation fluids. Gomaa et al. [Gomaa, A. M., Mahmoud, M. A., and Nasr-El-Din, H. A., Laboratory Study of Diversion Using Polymer-Based In-Situ-Gelled Acids, SPE Production & Operations Journal 26(3), 2011, 278-290, doi: 10.2118/132535-PA; incorporated herein by reference in its entirety] used CT scan to study wormhole propagation using an in-situ polymer-based gelled acid and a hydrochloric acid solution. The pressure drop and computed tomography scan (CT scan) are currently used to define the preferred injection rate of acid in acidizing operations. These techniques are also used to determine wormhole shapes in acid-treated carbonate formations. However, these techniques cannot determine the interconnectivity of the created wormholes to the pores structures in the formation.

In view of the forgoing, one objective of the present disclosure is to provide a method acidizing a geological formation, and a method of determining an effectiveness of the acidizing with NMR spectroscopy, wherein an interconnectivity number is calculated from NMR spectra before and after the acidizing to determine fluid connectivity of wormholes to pores structures of the geological formation.

BRIEF SUMMARY OF THE INVENTION

According to a first aspect, the present disclosure relates to a method of acidizing a geological formation surrounding a wellbore, involving i) recording a first nuclear magnetic resonance (NMR) spectrum of a portion of the geological formation over a micro-pore relaxation range, a meso-pore relaxation range, and a macro-pore relaxation range, ii) calculating a first interconnectivity number by dividing a first micro-meso interconnectivity number to a first meso-macro interconnectivity number, wherein the first micro-meso interconnectivity number is a ratio of an intensity of the first NMR spectrum at a micro-meso diffusional coupling to a peak intensity of the first NMR spectrum in the micro-pore relaxation range or the meso-pore relaxation range, and the first meso-macro interconnectivity number is a ratio of an intensity of the first NMR spectrum at a meso-macro diffusional coupling to a peak intensity of the first NMR spectrum in the meso-pore relaxation range or the macro-pore relaxation range, iii) acidizing the geological formation by delivering a first stimulation fluid to the portion of the geological formation, thereby forming an acidized geological formation, iv) recording a second NMR spectrum of the acidized geological formation over the micro-pore relaxation range, the meso-pore relaxation range, and the macro-pore relaxation range, v) calculating a second interconnectivity number by dividing a second micro-meso interconnectivity number to a second meso-macro interconnectivity number, wherein the second micro-meso interconnectivity number is a ratio of an intensity of the second NMR spectrum at a micro-meso diffusional coupling to a peak intensity of the second NMR spectrum in the micro-pore relaxation range or the meso-pore relaxation range, and the second meso-macro interconnectivity number is a ratio of an intensity of the second NMR spectrum at a meso-macro diffusional coupling to a peak intensity of the second NMR spectrum in the meso-pore relaxation range or the macro-pore relaxation range, and vi) re-acidizing the acidized geological formation by delivering a second stimulation fluid to the wellbore at a predetermined flow rate.

In one embodiment, the first interconnectivity number determines a fluid connectivity between pore structures of the geological formation, and the second interconnectivity number determines a fluid connectivity between pore structures of the acidized geological formation.

In one embodiment, the second interconnectivity number is non-linearly correlated with a permeability ratio of the geological formation, and the method further involves calculating the permeability ratio of the geological formation, wherein the permeability ratio is a ratio of a permeability of the acidized geological formation to the permeability of the geological formation.

In one embodiment, the geological formation is a carbonate formation with a permeability of 1 to 50 millidarcy.

In one embodiment, the geological formation has a porosity of 5-50%.

In one embodiment, acidizing the geological formation is carried out at a temperature of 80-120° C., and re-acidizing the acidized geological formation is carried out at a temperature of 80-120° C.

In one embodiment, the first stimulation fluid has a pH of 1-6 and the second stimulation fluid has a pH of 1-6.

In one embodiment, the second stimulation fluid is a chelation-based fluid that comprises 10-30 wt % of at least one chelating agent selected from the group consisting of ethylenediamine tetraacetic acid (EDTA), hydroxyethylenediamine triacetic acid (HEDTA), and glutamic diacetic acid (GLDA), relative to the total weight of the second stimulation fluid, wherein the second interconnectivity number is 0.7-1.0.

In one embodiment, the second stimulation fluid is an emulsified acid that comprises at least one mineral acid selected from the group consisting of hydrochloric acid, hydrofluoric acid, hydrobromic acid, hydroiodic acid, nitric acid, sulfuric acid, phosphoric acid, perchloric acid, and boric acid, wherein the second interconnectivity number is 0.4-0.6.

In one embodiment, the second stimulation fluid is an acid solution that comprises 10-20 wt % of at least one mineral acid in freshwater, relative to the total weight of the second stimulation fluid, wherein the at least one mineral acid is selected from the group consisting of hydrochloric acid, hydrofluoric acid, hydrobromic acid, hydroiodic acid, nitric acid, sulfuric acid, phosphoric acid, perchloric acid, and boric acid.

In one embodiment, the wellbore is a vertical wellbore, a horizontal wellbore, or a multi-lateral wellbore.

In one embodiment, at least one wormhole is formed in the geological formation after the acidizing.

In one embodiment, the first and the second NMR spectra are recorded with an NMR-logging tool.

In one embodiment, the predetermined flow rate is determined from a calibration curve that correlates the second interconnectivity number to a flow rate of the first stimulation fluid.

In one embodiment, the second stimulation fluid is a chelation-based fluid that comprises 10-30 wt % of at least one chelating agent selected from the group consisting of EDTA, HEDTA, and GLDA, relative to the total weight of the second stimulation fluid, wherein the predetermined flow rate is 1-4 $cm^3$/min.

According to a second aspect, the present disclosure relates to a method of determining an effectiveness of acidizing a geological formation, the method involving i) recording a first nuclear magnetic resonance (NMR) spectrum of the geological formation over a micro-pore relaxation range, a meso-pore relaxation range, and a macro-pore relaxation range, ii) calculating a first interconnectivity number by dividing a first micro-meso interconnectivity number to a first meso-macro interconnectivity number, wherein the first micro-meso interconnectivity number is a ratio of an intensity of the first NMR spectrum at a micro-meso diffusional coupling to a peak intensity of the first NMR spectrum in the micro-pore relaxation range or the meso-pore relaxation range, and the first meso-macro interconnectivity number is a ratio of an intensity of the first NMR spectrum at a meso-macro diffusional coupling to a peak intensity of the first NMR spectrum in the meso-pore relaxation range or the macro-pore relaxation range, iii) acidizing the geological formation by delivering a stimulation fluid to the wellbore, thereby forming an acidized geological formation, iv) recording a second NMR spectrum of the acidized geological formation over the micro-pore relaxation range, the meso-pore relaxation range, and the macro-pore relaxation range, v) calculating a second interconnectivity number by dividing a second micro-meso interconnectivity number to a second meso-macro interconnectivity number, wherein the second micro-meso interconnectivity number is a ratio of an intensity of the second NMR spectrum at a micro-meso diffusional coupling to a peak intensity of the second NMR spectrum in the micro-pore relaxation range or the meso-pore relaxation range, and the second meso-macro interconnectivity number is a ratio of an intensity of the second NMR spectrum at a meso-macro diffusional coupling to a peak intensity of the second NMR spectrum in the meso-pore relaxation range or the macro-pore relaxation range, vi) comparing the first interconnectivity number with the second interconnectivity number to determine the effectiveness of acidizing the geological formation.

In one embodiment, the stimulation fluid is a chelation-based fluid that comprises 10-30 wt % of at least one chelating agent selected from the group consisting of ethylenediamine tetraacetic acid (EDTA), hydroxyethylenediamine triacetic acid (HEDTA), and glutamic diacetic acid (GLDA), relative to the total weight of the stimulation fluid, wherein the permeability ratio is 0.5-1.0.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Embodiments of the present disclosure will now be described more fully hereinafter with reference to the accompanying drawings, in which some, but not all embodiments of the disclosure are shown.

The present disclosure will be better understood with reference to the following definitions. As used herein, the words "a" and "an" and the like carry the meaning of "one or more." Within the description of this disclosure, where a numerical limit or range is stated, the endpoints are included unless stated otherwise. Also, all values and subranges within a numerical limit or range are specifically included as if explicitly written out.

According to a first aspect, the present disclosure relates to a method of acidizing a geological formation surrounding a wellbore.

Figure 14:
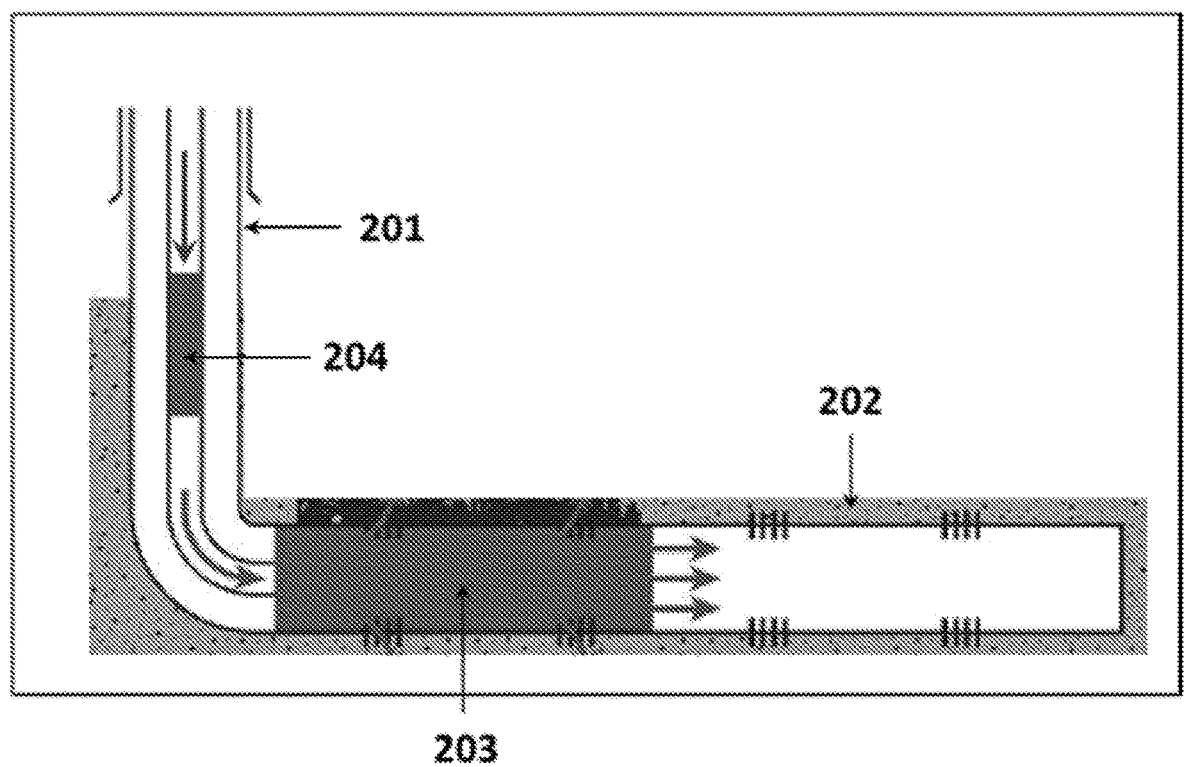
FIG. 14 illustrates a geological formation surrounding a wellbore undergoing acidizing and re-acidizing treatments.
Figure 15:
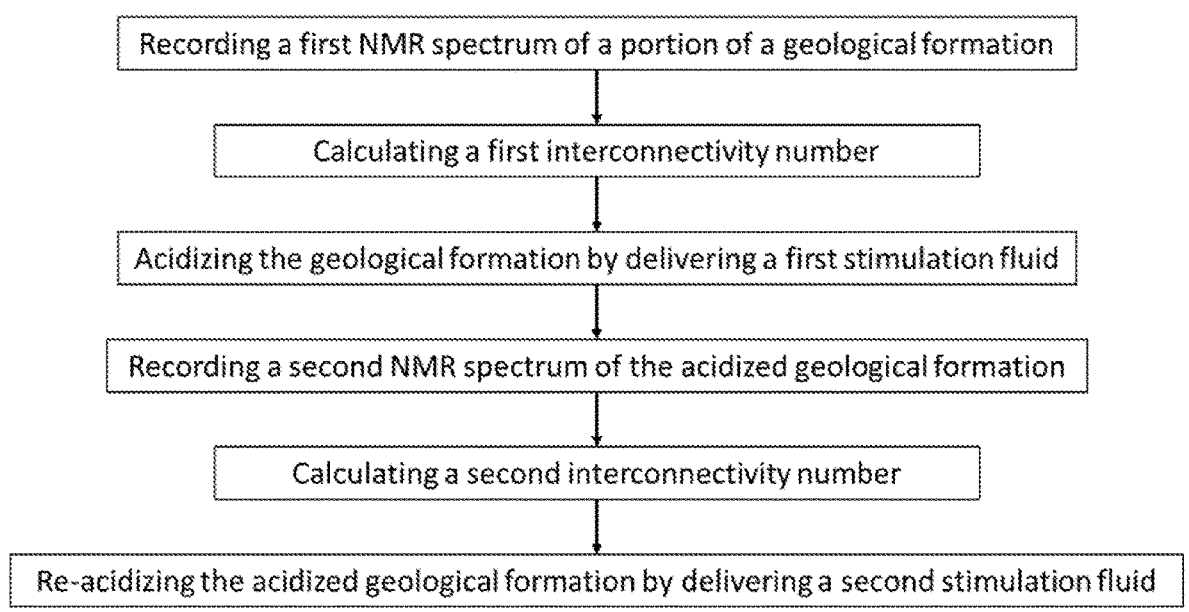
FIG. 15 is a flow diagram showing the steps involved in the method of acidizing a geological formation surrounding a wellbore.

As shown in FIGS. 14 and 15, the method of acidizing a geological formation 202 surrounding a wellbore 201 may involve the steps of i) recording a first nuclear magnetic resonance (NMR) spectrum of a portion of the geological formation 202 over a micro-pore relaxation range, a meso-pore relaxation range, and a macro-pore relaxation range, ii) calculating a first interconnectivity number by dividing a first micro-meso interconnectivity number to a first meso-macro interconnectivity number, wherein the first micro-meso interconnectivity number is a ratio of an intensity of the first NMR spectrum at a micro-meso diffusional coupling to a peak intensity of the first NMR spectrum in the micro-pore relaxation range or the meso-pore relaxation range, and the first meso-macro interconnectivity number is a ratio of an intensity of the first NMR spectrum at a meso-macro diffusional coupling to a peak intensity of the first NMR spectrum in the meso-pore relaxation range or the macro-pore relaxation range, iii) acidizing the geological formation 202 by delivering a first stimulation fluid 203 to the portion of the geological formation 202, thereby forming an acidized geological formation, iv) recording a second NMR spectrum of the acidized geological formation over the micro-pore relaxation range, the meso-pore relaxation range, and the macro-pore relaxation range, v) calculating a second interconnectivity number by dividing a second micro-meso interconnectivity number to a second meso-macro interconnectivity number, wherein the second micro-meso interconnectivity number is a ratio of an intensity of the second NMR spectrum at a micro-meso diffusional coupling to a peak intensity of the second NMR spectrum in the micro-pore relaxation range or the meso-pore relaxation range, and the second meso-macro interconnectivity number is a ratio of an intensity of the second NMR spectrum at a meso-macro diffusional coupling to a peak intensity of the second NMR spectrum in the meso-pore relaxation range or the macro-pore relaxation range, and vi) re-acidizing the acidized geological formation by delivering a second stimulation fluid 204 to the wellbore 201 at a predetermined flow rate.

The geological formation may be a carbonate formation, a sandstone formation, a shale formation, a clay formation, etc. In a preferred embodiment, the geological formation is a carbonate formation, e.g. limestone or dolostone, which contains carbonate minerals, such as calcite, aragonite, dolomite, etc. In another preferred embodiment, the geological formation is a carbonate formation, which contains at least 98 wt %, preferably at least 99 wt % of calcite, and less than 1.0 wt %, preferably 0.1-0.5 wt % of quartz. Each weight percentile is determined by a compositional analysis of a sample rock from the geological formation using XRD, and is defined relative to the total weight of the sample rock. As used herein, the "sandstone formation" is a formation that mainly contains quartz, feldspar, rock fragments, mica and numerous additional mineral grains held together with silica and/or cement; the "shale formation" is a formation that mainly contains clay minerals and quartz; and the "clay formation" is a formation that mainly contains chlorite, illite, kaolinite, montmorillonite and smectite.

The geological formation may have a permeability of 10 µd (microdarcy) to 500 md (millidarcy), preferably 100 µd to 400 md, preferably 500 µd to 300 md, preferably 1-200 md, preferably 1-50 md, preferably 2-40 md, preferably 3-30 md, preferably 4-20 md, preferably 5-15 md, preferably about 10 md. In a preferred embodiment, the geological formation is a carbonate formation that mainly contains Indiana limestone with an average permeability of preferably 4-20 md, preferably 5-15 md, preferably about 10 md. In one embodiment, a well logging tool, as known to those skilled in the art such as an NMR-logging tool, is employed to determine the permeability of the geological formation along a depth/length of the wellbore.

In one embodiment, the geological formation has an average porosity of 5-50%, preferably 6-40%, preferably 7-30%, preferably 8-25%, preferably 10-20%, preferably 12-18%, preferably about 15%. As used here, the term "porosity" refers to a total pore volume per unit volume of the geological formation. The total porosity refers to a total volume of isolated pores and empty spaces occupied by clay-bound water or formation fluids. The porosity of the geological formation may be measured by various methods as known to those skilled in the art, e.g. density, neutron porosity, nuclear magnetic resonance (NMR) spectroscopy, etc. In one embodiment, the porosity of the geological formation is measured by NMR spectroscopy. In addition, the term "pore" as used here refers to a discrete void within the geological formation, which may contain air, water, hydrocarbons or other fluids.

Figure 1:
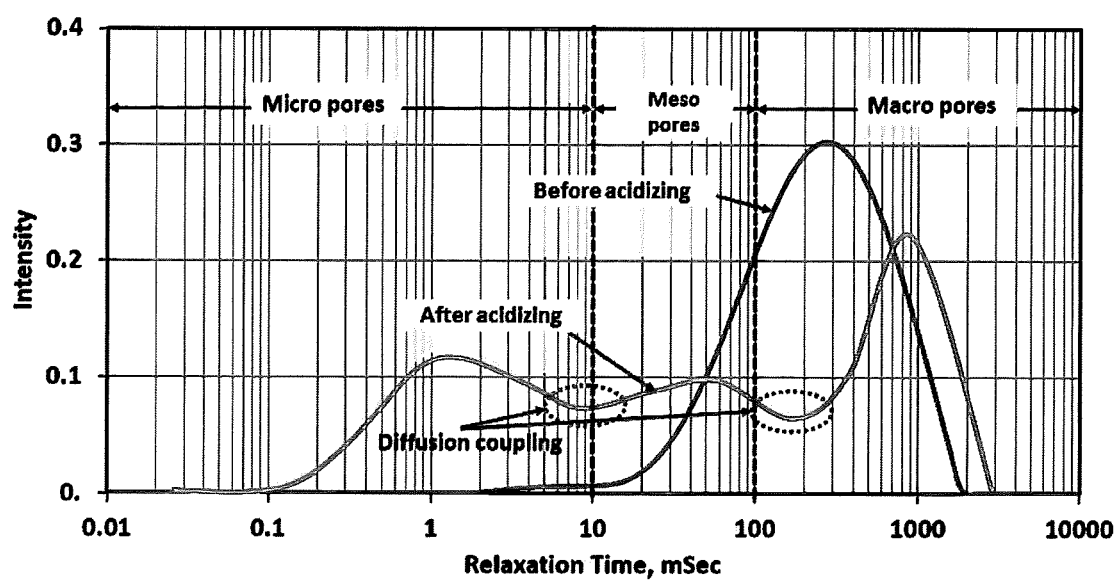
FIG. 1 represents NMR spectra of a geological formation over a micro-pore relaxation range, a meso-pore relaxation range, and a macro-pore relaxation range before and after an acidizing operation, wherein the geological formation is acidized with an acid solution that includes 15 wt % of hydrochloric acid dissolved in freshwater.
Figure 2:
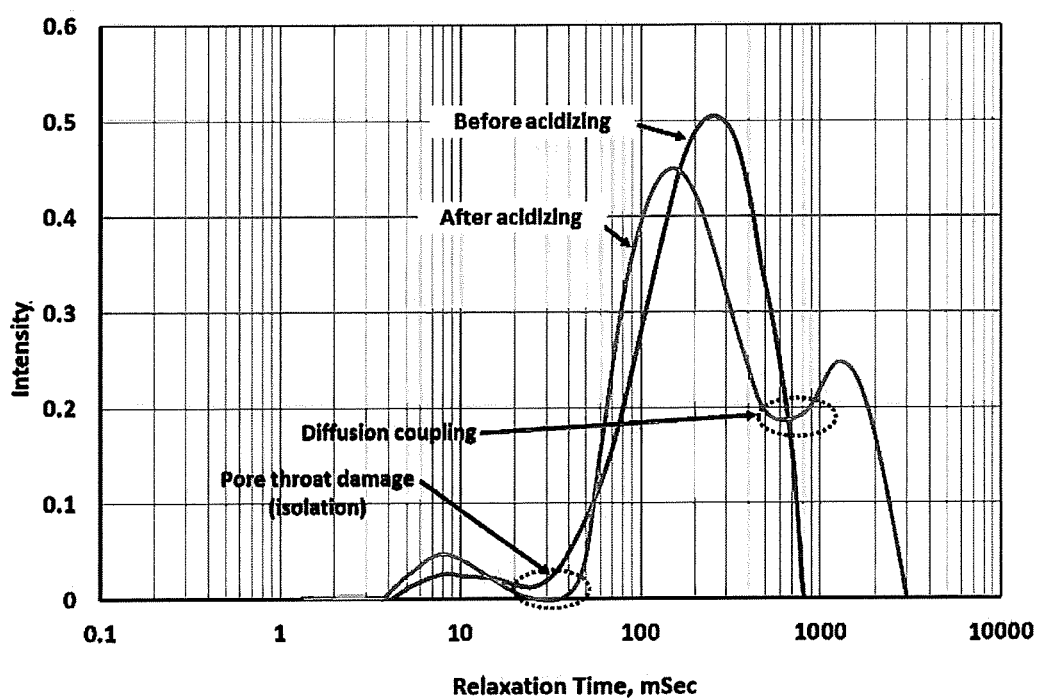
FIG. 2 represents NMR spectra of a geological formation over the micro-pore relaxation range, the meso-pore relaxation range, and the macro-pore relaxation range before and after an acidizing operation, wherein the geological formation is acidized with an acid solution that includes 15 wt % of hydrochloric acid dissolved in seawater.

In one embodiment, the pores of the geological formation are identified by NMR spectroscopy, wherein nuclei (i.e. $H^+$) present in the pores absorb electromagnetic radiation of a specific frequency in the presence of a strong magnetic field, and further provide an image of nuclide concentration and subsequently a relaxation time of the pores. Accordingly, the pores may preferably be characterized as micro-pores with a micro-pore relaxation range (i.e. a relaxation time of less than 0.01 to 10 milli-seconds (mSec), preferably 0.01 to 10 mSec); meso-pores with a meso-pore relaxation range (i.e. a relaxation time of 10 to 100 mSec); and macro-pores with a macro-pore relaxation range (i.e. a relaxation time of 100 to at least 10,000 mSec, preferably 100 to 10,000 mSec). FIG. 1 represents an exemplary NMR spectra before and after an acidizing operation over a micro-pore relaxation range, a meso-pore relaxation range, and a macro-pore relaxation range. In view of that, the "micro-pores" as used in this disclosure refers to pores present in the geological formation that has a relaxation time in the range of less than 0.01 to 10 mSec, preferably 0.01 to 10 mSec; the "meso-pores" as used in this disclosure refers to pores in the geological formation that has a relaxation time in the range of 10 to 100 mSec; and the "macro-pores" as used in this disclosure refers to pores in the geological formation that has a relaxation time in the range of 100 to at least 10,000 mSec, preferably 100 to 10,000 mSec.

In one embodiment, the wellbore is a vertical wellbore, a horizontal wellbore, or a multi-lateral wellbore. As used here, a "vertical wellbore" is a wellbore that has a vertical section, which is substantially perpendicular to a surface of the ground. As used here, a "horizontal wellbore" is a wellbore that has a vertical section and a horizontal lateral section with an inclination angle (an angle between the vertical section and the horizontal lateral section) of at least 70°, preferably at least 80°, or in the range of 85° to 90°. As used here, a "multilateral wellbore" refers to a wellbore that has a main/central borehole and a plurality of laterals that are extended outwardly therefrom.

A downhole temperature of the wellbore may depend on the type of the wellbore and a depth of the wellbore. For example, in one embodiment, the wellbore is a vertical wellbore with a depth of 1-10 km, preferably 2-6 km, wherein a downhole temperature of the wellbore is no more than 150° C., preferably from about 80 to 120° C., preferably 90 to 110° C. In some embodiments, the wellbore is a horizontal wellbore and the temperature may not vary significantly along a horizontal lateral section of the wellbore.

The term "acidizing" as used in this disclosure refers to a process whereby a pressurized fluid, i.e. a stimulation fluid, is pumped/injected to the geological formation through the wellbore, wherein the stimulation fluid dissolves sediments and/or mud solids, removes formation residues and/or fragments that inhibit permeability, and/or forms wormholes, in order to restore or enhance a production rate of formation fluids.

Depending on the type of the geological formation, the stimulation fluid may interact differently with the formation to restore or enhance the production rate of formation fluids. For example, in a preferred embodiment, the geological formation is a carbonate formation, wherein the stimulation fluid dissolves a portion of the formation as well as fragments that inhibit permeability. In another embodiment, the geological formation is a sandstone formation, wherein the stimulation fluid reacts with soluble substances in the formation to enlarge pores.

The stimulation fluid may be pumped/injected into the wellbore at a pressure below a fracture pressure of the geological formation to remove formation damages, residues and/or fragments. Accordingly, in some embodiments, the stimulation fluid is injected at a pressure of no more than 5,000 psi, preferably 100 to 3,000 psi, preferably 200 to 2,000 psi, preferably 300 to 1,000 psi. Alternatively, the stimulation fluid may be pumped or injected into the wellbore at a pressure above a fracture pressure of the geological formation (also known as acid fracturing) to remove formation damages and to induce fractures in the formation. Accordingly, in some embodiments, the stimulation fluid is injected at a pressure of 1,000 to 30,000 psi, preferably 3,000 to 20,000 psi, preferably 5,000 to 10,000 psi.

The stimulation fluid may be pumped or injected into the wellbore with various methods as known to those skilled in the art. For example, in one embodiment, injecting the stimulation fluid may be carried out by disposing a nozzle on one end of a tube or a pipe that transfers the stimulation fluid to a downhole of the wellbore. Said nozzle may have various shapes and geometries, as known to those skilled in the art. For example, in one embodiment, the nozzle is a perforated tube with a capped end and perforations are circumferentially oriented along the perforated tube to create a radial flow of the stimulation fluid. In certain embodiments, the stimulation fluid is injected through tubing, as known to those skilled in the art, which is located inside the wellbore to selectively acidize certain spots in the wellbore.

The stimulation fluid may be injected at various flow rates, depending on a total volume of the wellbore. For example, in some embodiments, the stimulation fluid is injected at a flow rate of 1-1,000 L/min, preferably 20-800 L/min, preferably 50-500 L/min, preferably 100-300 L/min. In some preferred embodiments, the stimulation fluid is injected at a predetermined flow rate, which is calculated from a second interconnectivity number, as described in this disclosure. In view of the abovementioned flow rates, a total volume of the stimulation fluid that is injected may vary in the range from about 100 to 400,000 L, preferably 1,000 to 300,000 L, preferably 2,000 to 200,000 L.

In one embodiment, the stimulation fluid has a pH of 0.5-6.5, preferably 1-6, preferably 2-5, preferably 3-4, more preferably about 4. The pH of the stimulation fluid may be advantageously suited for acidizing operations, however, a person having ordinary skill in the art may adjust the pH of the stimulation fluid, for example with the use of a buffer, to avoid damage/corrosion to equipment, such as metal equipment, etc.

In a preferred embodiment, the stimulation fluid is a chelation-based fluid that includes 10-30 wt %, preferably 15-25 wt %, preferably about 20 wt % of at least one chelating agent, which is dissolved in 70-95 wt %, preferably 75-85 wt %, preferably about 80 wt % of an aqueous liquid, wherein each weight percentile is relative to the total weight of the chelation-based fluid. In a preferred embodiment, the at least one chelating agent is selected from the group consisting of EDTA (ethylenediamine tetraacetic acid), HEDTA (hydroxyethylenediamine triacetic acid), and GLDA (glutamic diacetic acid). Further chelating agents may be present in the stimulation fluid in addition to, or in lieu of the abovementioned chelating agents such as, without limitation, NTA (nitriolotriacetic acid), DTPA (diethylenetriaminepentaacetic acid), MGDA (methylglycinediacetic acid), HEIDA (2-hydroxyethyliminodiacetic acid), CDTA (trans-cyclohexane-1,2-diaminetetraacetic acid), EGTA (ethylene glycol-bis(β-aminoethyl ether)-N,N,N',N'-tetraacetic acid), EDDA (ethylenediaminediacetic acid), propylene diamine tetraacetic acid (PDTA), ethylene diamine-N,N"-di(hydroxyphenylacetic) acid (EDDHA), ethylene diamine-N,N"-di-(hydroxy-methylphenyl) acetic acid (EDDHMA), and derivatives and/or salts thereof.

As used here, the "aqueous liquid" refers to any water containing solution, including saltwater, hard water, or freshwater. Accordingly, the term "saltwater" may include saltwater with a chloride ion content in the range of between about 6,000 ppm and saturation, and is intended to encompass seawater and other types of saltwater including groundwater that contains additional impurities typically found therein. The term "hard water" may include water having mineral concentrations between about 2,000 mg/L and about 300,000 mg/L. The term "freshwater" may include water sources that contain less than 6,000 ppm, preferably less than 5,000 ppm, preferably less than 4,000 ppm, preferably less than 3,000 ppm, preferably less than 2,000 ppm, preferably less than 1,000 ppm, preferably less than 500 ppm, preferably less than 200 ppm, preferably less than 100 ppm, preferably less than 50 ppm, preferably less than 10 ppm, preferably less than 5 ppm, preferably less than 1 ppm of salts minerals and/or any other dissolved solids. The aqueous liquid may be supplied from a natural source, such as an aquifer, a lake, and/or an ocean, and may be filtered to remove large solids. In one embodiment, the aqueous liquid is seawater with a total dissolved solid in the range of 30,000 to 60,000 mg/L, preferably 35,000 to 55,000 mg/L. Water that is supplied from bays, lakes, rivers, creeks, and/or underground water resources may also be referred to as "seawater." In some preferred embodiments, the aqueous liquid is freshwater with a total dissolved solid of less than 3,000 mg/L, preferably 10-2,000 mg/L, preferably 50-1,000 mg/L. The aqueous liquid may further refer to a distilled and/or desalinated (deionized) water, for example, a water having a resistivity of less than 30 MΩ·cm, preferably less than 20 MΩ·cm, at room temperature (i.e. 20-30° C.).

In one embodiment, the stimulation fluid is an emulsified acid that includes a mineral acid, which is dispersed (or emulsified) in an oil phase in the presence of an emulsifier. Preferably, the mineral acid is present in the emulsified acid at a volumetric concentration of 60-80 vol %, preferably 65-75 vol %, preferably about 70 vol %, and the oil phase is present in the emulsified acid at a volumetric concentration of 20-40 vol %, preferably 25-35 vol %, preferably about 30 vol %, wherein each volume percentile is relative to the total volume of the emulsified acid. In some embodiments, the mineral acid is at least one selected from the group consisting of hydrochloric acid, hydrofluoric acid, hydrobromic acid, hydroiodic acid, nitric acid, sulfuric acid, phosphoric acid, perchloric acid, and boric acid. In a preferred embodiment, the mineral acid consists of hydrochloric acid. The oil phase may include at least one of crude oil, diesel, kerosene, gas condensate, gas oil, gasoline, reformate, naphthalene, xylene, and toluene, etc. In a preferred embodiment, the oil phase consists of diesel. The emulsifier may be at least one compound selected from the group consisting of an ethoxylated glycol, an ethoxylated phenol, a propoxylated glycol, a propoxylated phenol, an ethoxylated and propoxylated glycol, and an ethoxylated and propoxylated phenol. In certain embodiments, the emulsifier may contain an ethoxylated (polyethylene oxide-like) sequence to increase a hydrophilic character of the emulsifier, and/or a propoxylated (polypropylene oxide-like) sequence to increase a lipophilic character of the emulsifier. The emulsifier may be present at a volumetric concentration of 0.1-4 vol %, preferably 0.5-3 vol %, preferably 1.0-2.0 vol %, relative to the total volume of the emulsified acid. The emulsified acid may further include a corrosion inhibitor, which may be present at a concentration of 0.1-0.5% by volume, preferably 0.2-0.4% by volume, more preferably about 0.3% by volume relative to the total volume of the emulsified acid. Examples of the corrosion inhibitor include, without limitation, barium borate, benzotriazole, cinnamaldehyde, 1,2-diaminopropane, dibutylamine, diethylhydroxylamine, dimethylethanolamine, 3,5-dinitrobenzoic acid, ethylenediamine, hexamethylenetetramine, hydrazine, lead oxide, lithium nitrite, sodium nitrite, zinc borate, zinc dithiophosphate, zinc oxide, zinc phosphate, methanol, isopropanol, propargyl alcohol, an aliphatic amide, etc.

In one embodiment, the stimulation fluid is an acid solution that includes at least one mineral acid dissolved in water (e.g. seawater or preferably freshwater). The at least one mineral acid may be selected from the group consisting of hydrochloric acid, hydrofluoric acid, hydrobromic acid, hydroiodic acid, nitric acid, sulfuric acid, phosphoric acid, perchloric acid, and boric acid. In a preferred embodiment, the acid solution includes hydrochloric acid dissolved in the aqueous liquid (e.g. seawater or preferably freshwater). The type of the mineral acid that is used in the acid solution may vary depending on the type of the geological formation. Also, the abovementioned mineral acids may be mixed at various volumetric/weight concentrations. For example, in some preferred embodiment, the geological formation is a carbonate formation and the acid solution contains 10-20 wt %, preferably about 15 wt % of hydrochloric acid in seawater or preferably freshwater, relative to the total weight of the acid solution. In one embodiment, the geological formation is a carbonate formation and the acid solution contains hydrochloric acid and hydrofluoric acid, wherein a volume ratio of hydrochloric acid to hydrofluoric acid may be in the range of 2:1 to 12:1, preferably 4:1 to 9:1, preferably 5:1 to 7:1. In some preferred embodiments, the acid solution further includes less than 1.0 vol %, preferably 0.1-0.5 vol %, preferably 0.2-0.4 vol %, preferably about 0.3 vol % of a corrosion inhibitor (e.g. one or more of the aforementioned corrosion inhibitors), relative to the total volume of the acid solution.

In certain embodiments, the stimulation fluid is a polymer-based gelled acid, which includes 1-10 wt %, preferably 2-8 wt %, preferably about 5 wt % of at least one mineral acid (e.g. one or more of the aforementioned mineral acids, preferably hydrochloric acid); 0.1-2.0 wt %, preferably 0.2-1.0 wt %, preferably about 0.5 wt % of a copolymer (e.g. block copolymers of ethylene oxide and propylene oxide, block copolymers of polyethylene glycol and polypropylene glycol, etc.); less than 1.0 vol %, preferably 0.1-0.5 vol %, preferably 0.2-0.4 vol %, preferably about 0.3 vol % of a corrosion inhibitor (e.g. one or more of the aforementioned corrosion inhibitors); less than 1.0 vol %, preferably 0.2-0.7 vol %, preferably 0.3-0.6 vol %, preferably about 0.45 vol % of a crosslinker (e.g. iron trichloride, a zirconium salt, an aluminum salt, ferric chloride, etc.); and less than 1.0 vol %, preferably 0.1-0.4 vol %, preferably 0.2-0.3 vol %, preferably about 0.25 vol % of a breaker (e.g. sodium erythorbate, calcium fluoride, an ethoxylated alcohol, a sodium salt, isoascorbic acid, hydroxyacetic acid, etc.); and a balance of an aqueous liquid (seawater or preferably freshwater), wherein each weight percentile is relative to the total weight of the polymer-based gelled acid. As used herein, the term "breaker" refers to an additive of the drilling fluid that provides a desired viscosity reduction in a specified period of time, for example, by breaking long-chain molecules into shorter segments. Also, the term "crosslinker" refers to an additive of the drilling fluid that can react with multiple-strand polymers to couple the molecules together, thereby creating a highly viscous fluid, with a controllable viscosity.

In one embodiment, the stimulation fluid is a VES-based gelled acid. The term "VES-based gelled acid" as used here refers to a gelled acid that contains a viscoelastic surfactant (VES). Accordingly, in some embodiments, the VES-based gelled acid includes 10-20 wt %, preferably about 15 wt % of at least one mineral acid (e.g. one or more of the aforementioned mineral acids, preferably hydrochloric acid); less than 1.0 vol %, preferably 0.1-0.5 vol %, preferably 0.2-0.4 vol %, preferably about 0.3 vol % of a corrosion inhibitor (e.g. one or more of the aforementioned corrosion inhibitors); 1-10 wt %, preferably 2-8 wt %, preferably 3-5 wt % of a viscoelastic surfactant, and a balance of an aqueous liquid (preferably freshwater or seawater), wherein each weight percentile is relative to the total weight of the VES-based gelled acid. As used here, a viscoelastic surfactant is a surfactant with molecules that are aggregated into worm-like micelles, differentiating them from non-viscoelastic surfactant molecules that are characterized by having one long hydrocarbon chain per surfactant head-group and do not forming micelles. Examples of the viscoelastic surfactant that may be used here include, without limitation N-erucyl-N,N-bis(2-hydroxyethyl)-N-methyl ammonium chloride and potassium oleate. As used here, a surfactant refers to a molecule (or molecules) comprises a hydrophilic head unit attached to one or more hydrophobic tails.

The stimulation fluid, as used in the present disclosure, is not limited to the abovementioned stimulation fluids, and various other stimulation fluids, as known to those skilled in the art may be used in addition to, or in lieu of, the stimulation fluid.

In some embodiments, each of the aforementioned stimulation fluids (e.g. the chelation-based fluid, the emulsified acid, the acid solution, the polymer-based gelled acid, and the VES-based gelled acid) may further include one or more additives selected from an alcohol, a glycol, an organic solvent, a soap, a fragrance, a dye, a dispersant, a water softener, a bleaching agent, an antifouling agent, an antifoaming agent, an anti-sludge agent, a catalyst, a diverting agent, an oxygen scavenger, a sulfide scavenger, a retarder, a gelling agent, a permeability modifier, a bridging agent, a shale stabilizing agent (such as ammonium chloride, tetramethyl ammonium chloride, or cationic polymers), a clay treating additive, a polyelectrolyte, a freezing point depressant, an iron-reducing agent, etc. The aforementioned additives, when present, may have a mass concentration independently of 0.01-5 wt %, preferably 0.5-3 wt %, more preferably 0.8-2 wt %, relative to a total weight of the stimulation fluid.

In one embodiment, acidizing the geological formation is carried out at a temperature of 80-120° C., preferably 85-115° C., preferably 90-110° C., preferably about 100° C. In some alternative embodiments, acidizing the geological formation is carried out at a temperature below 80° C., preferably 50-80° C., preferably 60-75° C. In view of that, in some embodiments, acidizing the geological formation is carried out in a time period of no longer than 5 hours, preferably in the range of 1 to 4 hours, preferably 2 to 3 hours, preferably in a continuous fashion.

Once the stimulation fluid is delivered to the wellbore and further injected into the geological formation surrounding the wellbore, an acidized geological formation may preferably be formed having at least one wormhole. As used herein, the term "wormhole" refers to a macro-pore channel that may penetrate up to several meters into carbonate formations, as a result of acid dissolution of limestone or dolomite in the carbonate formations. In certain embodiments, the at least one wormhole has a length in the range of 0.1-150 m, preferably 1-20 m, preferably 2-10 m, preferably 3-8 m, from the wellbore. In terms of the present disclosure, the wormholes that form after acidizing the geological formation may preferably be considered "macropores" with a macro-pore relaxation range as characterized by NMR spectroscopy.

Well operations, i.e. operations that are performed to produce formation fluids from the geological formation, e.g. drilling, production, maintenance, servicing, etc., may reduce an initial permeability of the geological formation by 10-100%, or 20-95%, or 30-90%, or 40-85%, or 50-80%. The "initial permeability" as used here refers to a permeability of the geological formation before any of the abovementioned well operations. In view of that, acidizing the geological formation with the stimulation fluid may recover at least a portion of the initial permeability that is inhibited/plugged by the abovementioned well operations. In some embodiments, acidizing the geological formation with the stimulation fluid may recover at least 80%, preferably at least 90%, preferably at least 95%, preferably at least 99%, preferably 100% of the initial permeability. In some preferred embodiments, acidizing the geological formation with the stimulation fluid recovers 100% of the initial permeability. For example, in a preferred embodiment, the geological formation has an initial permeability of 5 to 15 md, preferably about 10 md before the abovementioned well operations. After the abovementioned well operations, the permeability of the geological formation may be reduced to 0.1-2 md, or 0.2-1.5 md, or 0.5-1.0 md. In view of this embodiment, the permeability of the geological formation after acidizing with the stimulation fluid (e.g. the chelation-based fluid) is substantially the same as the initial permeability, i.e. 5 to 15 md, preferably about 10 md.

The method of acidizing the geological formation involves one or more pre-acidizing steps and one or more post-acidizing steps. In some preferred embodiments, the pre-acidizing steps and the post-acidizing steps are carried out for re-acidizing the geological formation with a preferred stimulation fluid at a predetermined flow (injection) rate and/or determining an effectiveness of the acidizing.

As a pre-acidizing step, the method involves recording a first NMR spectrum from the geological formation. The term "first NMR spectrum" as used in this disclosure refers to an NMR spectrum, which is recorded before acidizing the geological formation. The first NMR spectrum of the geological formation may preferably be recorded over the micro-pore relaxation range, the meso-pore relaxation range, and the macro-pore relaxation range, as shown in FIGS. 1-6. In one embodiment, the first NMR spectrum is obtained and recorded with an NMR-logging tool.

In terms of the present disclosure, nuclear magnetic resonance (NMR) spectroscopy refers to a well-logging method that provides information about nuclear magnetic properties of the geological formation, for example, fluid saturation by imaging nuclide concentration (i.e. $H^+$). During NMR spectroscopy a nucleus absorbs electromagnetic radiation of a specific frequency in the presence of a strong magnetic field. Parameters of the NMR-logging tool may be altered depending on the type of the geological formation, and a person of ordinary skill in the art may adjust those parameters before and/or during NMR spectroscopy.

As a further pre-acidizing step, the method involves calculating a first interconnectivity number using the first NMR spectrum. In terms of the present disclosure, the term "first interconnectivity number" refers to an interconnectivity number, which is obtained from the first NMR spectrum, and represents a fluid connectivity of pore structures in the geological formation before the acidizing.

As used in this disclosure, the term "interconnectivity number" refers to a quantitative parameter preferably on a scale of 0-1.0 (or 0-100%) that represents interconnectivity (i.e. fluid connectivity) between pore structures of the geological formation. In certain embodiments, the interconnectivity number may be above unity (or 100%), but preferably no more than 5 (or 500%), preferably no more than 4 (or 400%). The interconnectivity number may represent how well micro-pores, meso-pores, and macro-pores of a formation are fluidly connected. In an NMR spectrum that is taken after the acidizing, e.g. the first NMR spectrum, the interconnectivity number may represent how well pore structures of the geological formation (preferably micro-pores and meso-pores) are fluidly connected to one another. In an NMR spectrum that is taken after the acidizing, the interconnectivity number may represent how well pore structures of the geological formation (preferably micro-pores and meso-pores) are fluidly connected to the wormholes. For example, in one embodiment, an interconnectivity number of less than 0.2, or less than 0.1, or less than 0.05 represents that pore structures of the geological formation are poorly connected. In one embodiment, the pore structures are not fluidly connected (i.e. blocked) when the interconnectivity number is substantially zero. In one embodiment, an interconnectivity number of 0.2-0.6, or 0.25-0.55, or 0.3-0.5 represents that pore structures of the geological formation are fairly/moderately connected. Also, in one embodiment, an interconnectivity number of greater than 0.5, preferably greater than 0.55, preferably greater than 0.6 represents that pore structures of the geological formation are fluidly connected preferably without substantially having blocks/damages that inhibit permeability.

In terms of the present disclosure, the interconnectivity number is a ratio of a micro-meso interconnectivity number to a meso-macro interconnectivity number, as shown in the following equation:

$$ICN=ICN_{micro/meso}/ICN_{meso/macro}$$

wherein ICN is the interconnectivity number, $ICN_{micro/meso}$ is the micro-meso interconnectivity number, and $ICN_{meso/macro}$ is the meso-macro interconnectivity number.

As used herein, the term "micro-meso interconnectivity number" refers to a quantitative parameter preferably on the scale of 0-1.0 (or 0-100%) that represents interconnectivity (i.e. fluid connectivity) between micro-pores and meso-pores in a geological formation. In certain embodiments, the micro-meso interconnectivity number may be above unity (or 100%), but preferably no more than 5 (or 500%), preferably no more than 4 (or 400%). The micro-meso interconnectivity number is preferably a ratio of an intensity of an NMR spectrum of a geological formation at a micro-meso diffusional coupling to a peak intensity (i.e. the larger intensity) of the NMR spectrum in the micro-pore relaxation range or the meso-pore relaxation range. For example, in one embodiment, an NMR spectrum is recorded from a geological formation after an acidizing operation, as shown in FIG. 1. In view of that, the intensity of the NMR spectrum at the micro-meso diffusional coupling is about 0.075, whereas the peak intensity (i.e. the larger intensity) of the NMR spectrum in the micro-pore relaxation range or the meso-pore relaxation range is about 0.12. Therefore, the micro-meso interconnectivity number is about 0.075/0.12=0.625 or 62.5%.

As used herein, the term "meso-macro interconnectivity number" refers to a quantitative parameter preferably on the scale of 0-1.0 (or 0-100%) that represents interconnectivity (i.e. fluid connectivity) between meso-pores and macro-pores in a geological formation. In certain embodiments, the meso-macro interconnectivity number may be above unity (or 100%), but preferably no more than 5 (or 500%), preferably no more than 4 (or 400%). The meso-macro interconnectivity number is preferably a ratio of an intensity of the NMR spectrum at a meso-macro diffusional coupling to a peak intensity (i.e. a larger intensity) of the NMR spectrum in the meso-pore relaxation range or the macro-pore relaxation range. For example, in one embodiment, an NMR spectrum is recorded from a geological formation after an acidizing operation, as shown in FIG. 1. In view of that, the intensity of the NMR spectrum at the meso-macro diffusional coupling is about 0.07, whereas the peak intensity (i.e. the larger intensity) of the NMR spectrum in the meso-pore relaxation range or the macro-pore relaxation range is about 0.225. Therefore, the meso-macro interconnectivity number is about 0.07/0.225=0.31 or 31%.

As used in this disclosure, the term "diffusional coupling" or "diffusion coupling" refers to a time period during an NMR spectroscopy where nuclei (i.e. $H^+$) present in the pores lose their coherent energy as they move within the pores having different relaxation times. The diffusion coupling of various NMR spectra are shown in FIGS. 1-6.

As a post-acidizing step, the method involves recording a second NMR spectrum from the geological formation. The term "second NMR spectrum" as used in this disclosure refers to an NMR spectrum, which is recorded after acidizing the geological formation. The second NMR spectrum of the geological formation may preferably be recorded over substantially the same ranges as the first NMR spectrum is recorded, i.e. the micro-pore relaxation range, the meso-pore relaxation range, and the macro-pore relaxation range, as shown in FIGS. 1-6. In a preferred embodiment, the second NMR spectrum is obtained and recorded with the NMR-logging tool.

As a further post-acidizing step, the method involves calculating a second interconnectivity number using the second NMR spectrum. In terms of the present disclosure, the term "second interconnectivity number" refers to an interconnectivity number, which is obtained from the second NMR spectrum, and represents a fluid connectivity of pore structures in the acidized geological formation.

Similar to the first interconnectivity number, the second interconnectivity number is a ratio of the micro-meso interconnectivity number to the meso-macro interconnectivity number, wherein the micro-meso interconnectivity number and the meso-macro interconnectivity number are obtained from the second NMR spectrum. The micro-meso interconnectivity number and the meso-macro interconnectivity number are calculated in substantially the same way as described in the first interconnectivity number.

In one embodiment, the stimulation fluid is the emulsified acid, as described, wherein the second interconnectivity number is in the range of 0.4-0.6, or 0.45-0.55, or about 0.5. Accordingly, pore structures of the geological formation after acidizing with the emulsified acid are preferably moderately connected. In another embodiment, the stimulation fluid is the acid solution, which contains 15 wt % of hydrochloric acid dissolved in seawater, wherein the second interconnectivity number is less than 0.1, or less than 0.05, or in the range of 0-0.01. Accordingly, pore structures of the geological formation after acidizing with the acid solution are not fluidly connected, or poorly connected. Yet in another embodiment, the stimulation fluid is the polymer-based gelled acid, as described, wherein the second interconnectivity number is less than 0.1, or less than 0.05, or in the range of 0-0.01. Accordingly, pore structures of the geological formation after acidizing with the polymer-based gelled acid are not fluidly connected, or in certain embodiments poorly connected. In still a further embodiment, the stimulation fluid is the VES-based gelled acid, as described, wherein the second interconnectivity number is in the range of 0.3-0.55, or 0.35-0.5, or about 0.45. Accordingly, pore structures of the geological formation after acidizing with the polymer-based gelled acid are moderately connected. In some preferred embodiments, the stimulation fluid is the chelation-based fluid, as described, wherein the second interconnectivity number is in the range of 0.7-1.0, preferably 0.8-0.98, preferably 0.85-0.95. Accordingly, pore structures of the geological formation after acidizing with the chelation-based fluid are fluidly connected without having blocks/damages that inhibit permeability.

Once the first and the second interconnectivity numbers are calculated, in a preferred embodiment, the acidized geological formation is re-acidized by a preferred stimulation fluid and at a predetermined flow rate. In terms of the present disclosure, "re-acidizing" the geological formation is carried out in substantially the same way as in "acidizing." For example, in some embodiments, re-acidizing the acidized geological formation is carried out at a temperature of 80-120° C., preferably 85-115° C., preferably 90-110° C., preferably about 100° C., and in a time period of no longer than 5 hours, preferably in the range of 1 to 4 hours, preferably 2 to 3 hours, preferably in a continuous fashion.

Figure 6:
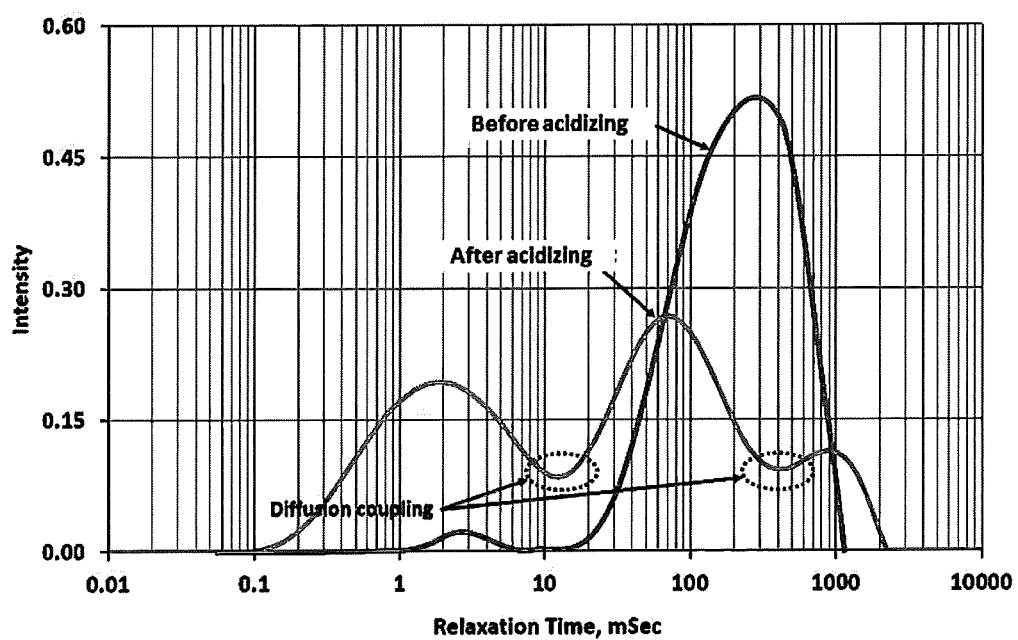
FIG. 6 represents NMR spectra of a geological formation over the micro-pore relaxation range, the meso-pore relaxation range, and the macro-pore relaxation range before and after an acidizing operation, wherein the geological formation is acidized with a chelation-based fluid at a flow (injection) rate of 2 cm$^3$/min, wherein the chelation-based fluid includes 20 wt % EDTA dissolved in freshwater.
Figure 11:
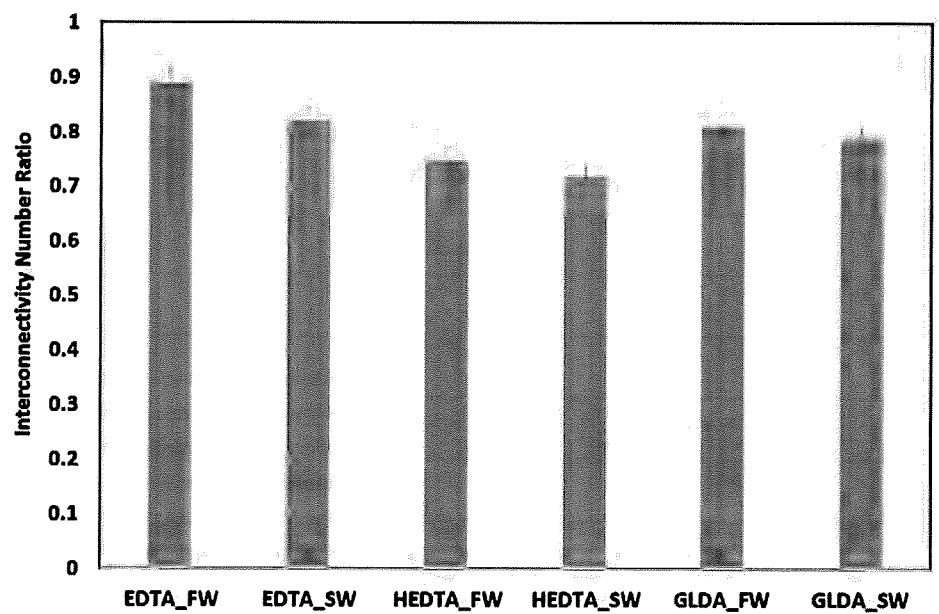
FIG. 11 represents an average interconnectivity number of a geological formation after acidizing the geological formation individually with a chelation-based fluid that includes 20 wt % EDTA in freshwater and seawater; a chelation-based fluid that includes 20 wt % HEDTA in freshwater and seawater; and a chelation-based fluid that includes 20 wt % GLDA in freshwater and seawater.

The "preferred stimulation fluid" that is used in re-acidizing the acidized geological formation may be preferably the stimulation fluid that provides a highest second interconnectivity number, when acidizing is carried out. In view of that, in some preferred embodiments, the preferred stimulation fluid is the chelation-based fluid. FIG. 6 represents the first and the second NMR spectra of the chelation-based fluid, which includes 20 wt % of EDTA diluted in freshwater. In addition, FIG. 11 represents the second interconnectivity number of various chelation-based fluids when used as the stimulation fluid for acidizing the geological formation.

In some preferred embodiments, the "predetermined flow rate" of the preferred stimulation fluid, which is used for the re-acidizing, is determined from a calibration curve that correlates the second interconnectivity number to a flow rate of the stimulation fluid. FIGS. 7-10 represent calibration curves for various stimulation fluids at various flow rates (or injection rates). In view of that, the predetermined flow rate is a flow rate of the stimulation fluid that provides a highest second interconnectivity number after the acidizing. The predetermined flow rate of various stimulation fluids for acidizing the geological formation are shown in FIGS. 7-10.

Figure 7:
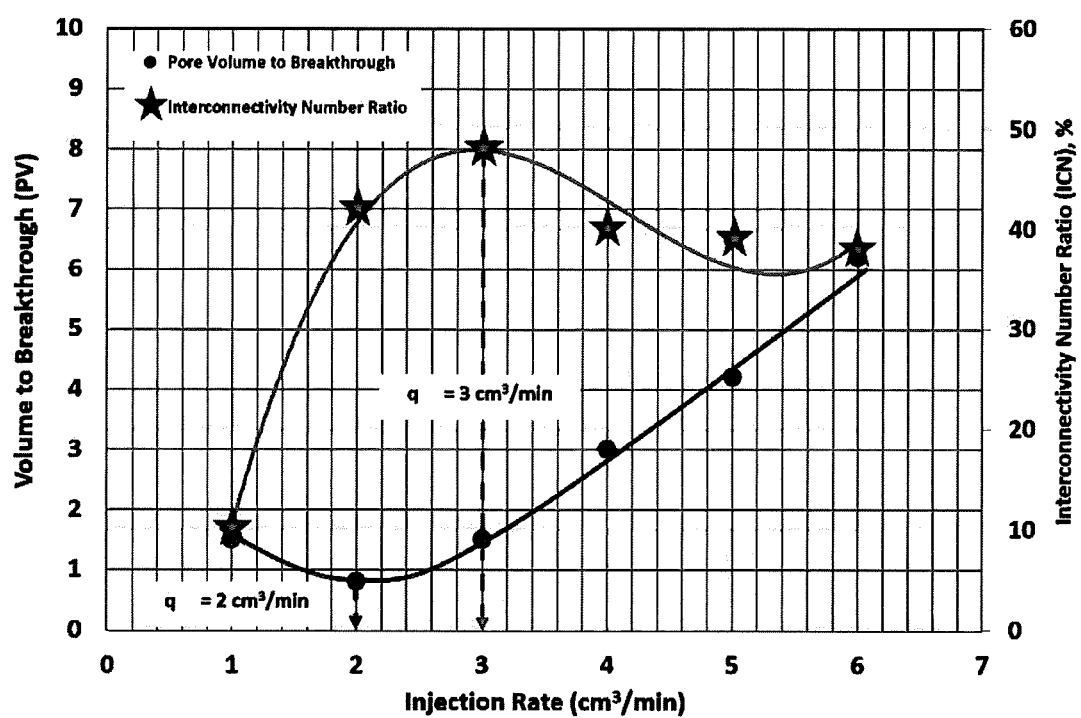
FIG. 7 represents an interconnectivity number and pore volume to breakthrough in a geological formation with respect to a flow (injection) rate of a stimulation fluid, wherein the stimulation fluid is a VES-based gelled acid.
Figure 8:
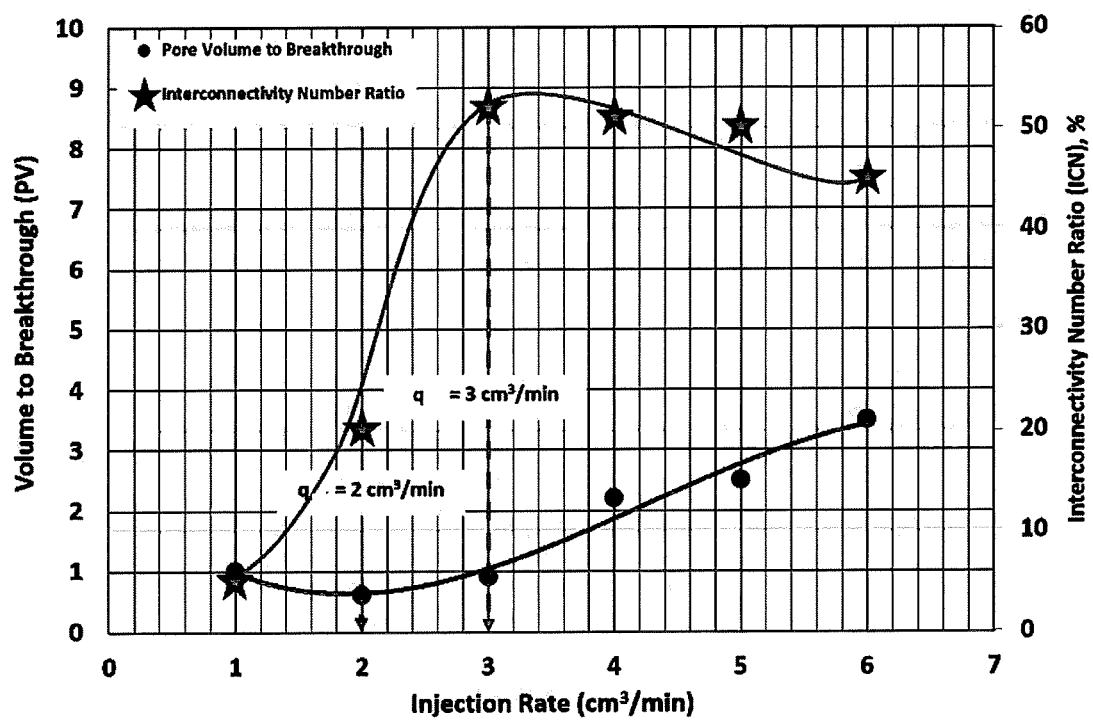
FIG. 8 represents an interconnectivity number and pore volume to breakthrough in a geological formation with respect to a flow (injection) rate of a stimulation fluid, wherein the stimulation fluid is an emulsified acid.
Figure 9:
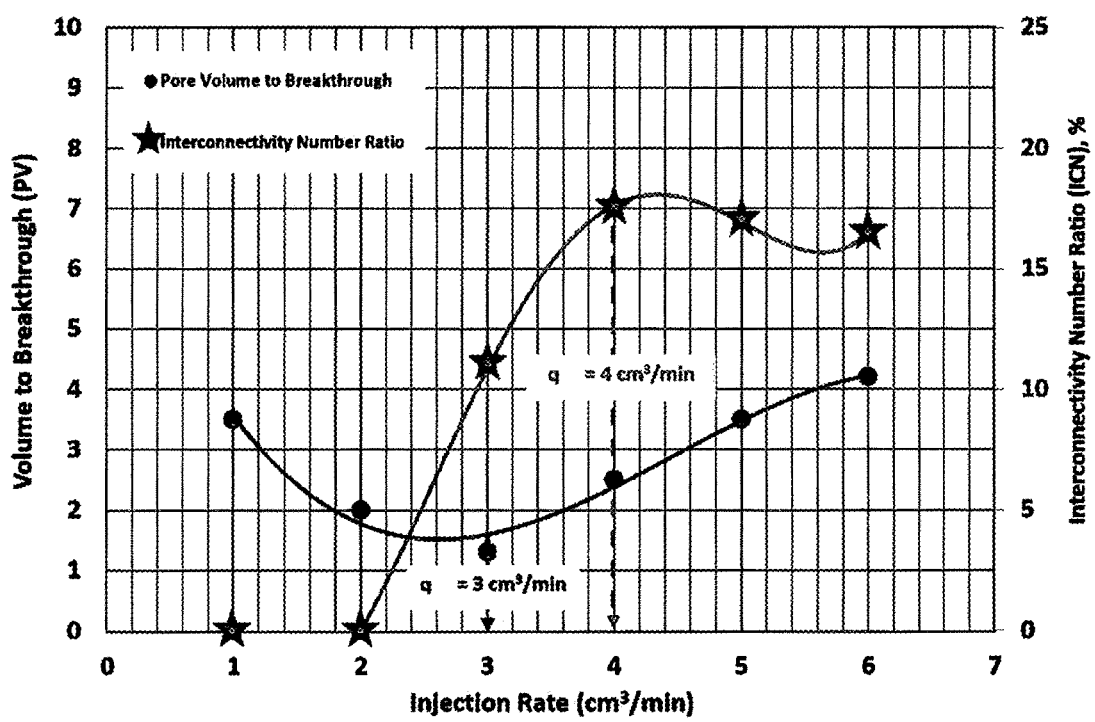
FIG. 9 represents an interconnectivity number and pore volume to breakthrough in a geological formation with respect to a flow (injection) rate of a stimulation fluid, wherein the stimulation fluid is a polymer-based gelled acid.
Figure 10:
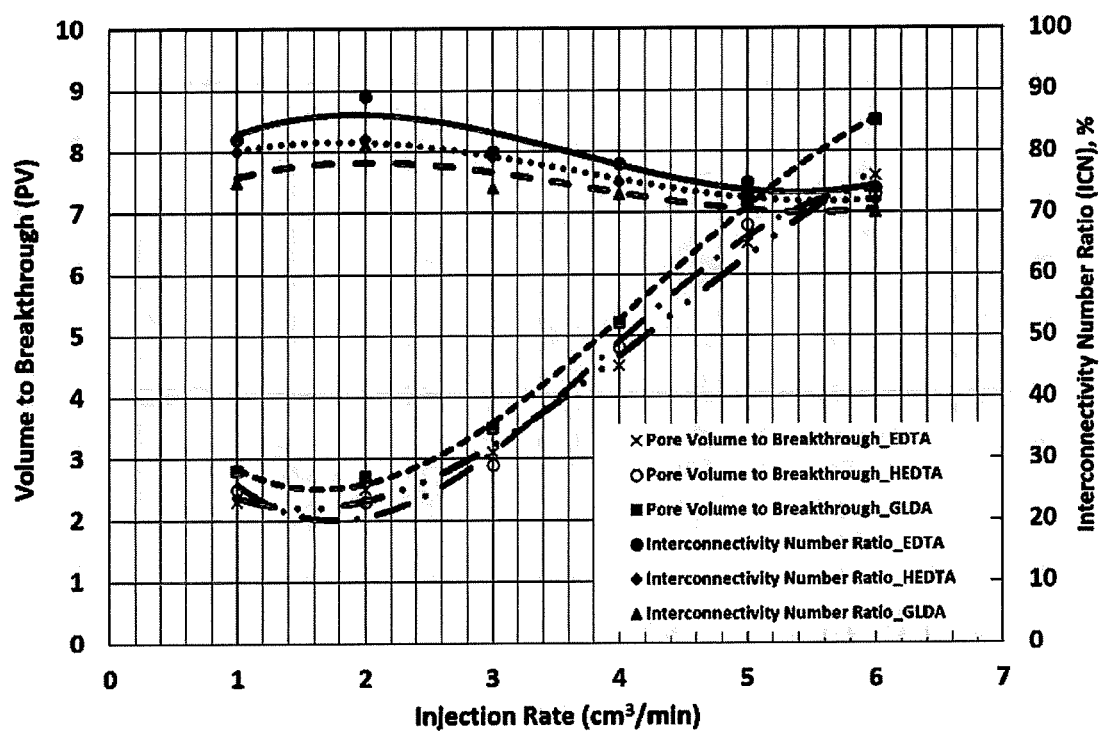
FIG. 10 represents an interconnectivity number and pore volume to breakthrough in a geological formation with respect to a flow (injection) rate of a stimulation fluid, wherein the stimulation fluid is individually, a chelation-based fluid that includes 20 wt % EDTA in freshwater, a chelation-based fluid that includes 20 wt % HEDTA in freshwater, and a chelation-based fluid that includes 20 wt % GLDA in freshwater.

For pilot-scale acidizing, in some embodiments, the stimulation is the VES-based gelled acid, as described, wherein the predetermined flow rate is in the range of 2-6 cm$^3$/min, preferably 2.5-3.5 cm$^3$/min, preferably about 3 cm$^3$/min, as shown in FIG. 7. In some other embodiments, the stimulation is the emulsified acid, as described, wherein the predetermined flow rate is in the range of 3-6 cm$^3$/min, preferably 3-5 cm$^3$/min, preferably about 3 cm$^3$/min, as shown in FIG. 8. Yet in some alternative embodiments, the stimulation is the polymer-based gelled acid, as described, wherein the predetermined flow rate is in the range of 3.5-6 cm$^3$/min, preferably 4-5 cm$^3$/min, preferably about 4 cm$^3$/min, as shown in FIG. 9. In some preferred embodiments, the stimulation is the chelation-based fluid, as described, wherein the predetermined flow rate is in the range of 1-4 cm$^3$/min, preferably 1.5-3 cm$^3$/min, preferably about 2 cm$^3$/min, as shown in FIG. 10.

For large-scale acidizing, in some embodiments, the stimulation is the VES-based gelled acid, as described, wherein the predetermined flow rate is in the range of 1-1,000 L/min, preferably 20-800 L/min, preferably 50-500 L/min, preferably 100-300 L/min. In some other embodiments, the stimulation is the emulsified acid, as described, wherein the predetermined flow rate is in the range of 5-1,000 L/min, preferably 50-800 L/min, preferably 100-600 L/min, preferably 200-400 L/min. Yet in some alternative embodiments, the stimulation is the polymer-based gelled acid, as described, wherein the predetermined flow rate is in the range of 5-1,000 L/min, preferably 50-800 L/min, preferably 100-600 L/min, preferably 200-400 L/min. In some preferred embodiments, the stimulation is the chelation-based fluid, as described, wherein the predetermined flow rate is in the range of 1-600 L/min, preferably 5-400 L/min, preferably 10-200 L/min, preferably 50-100 L/min.

Figure 13:
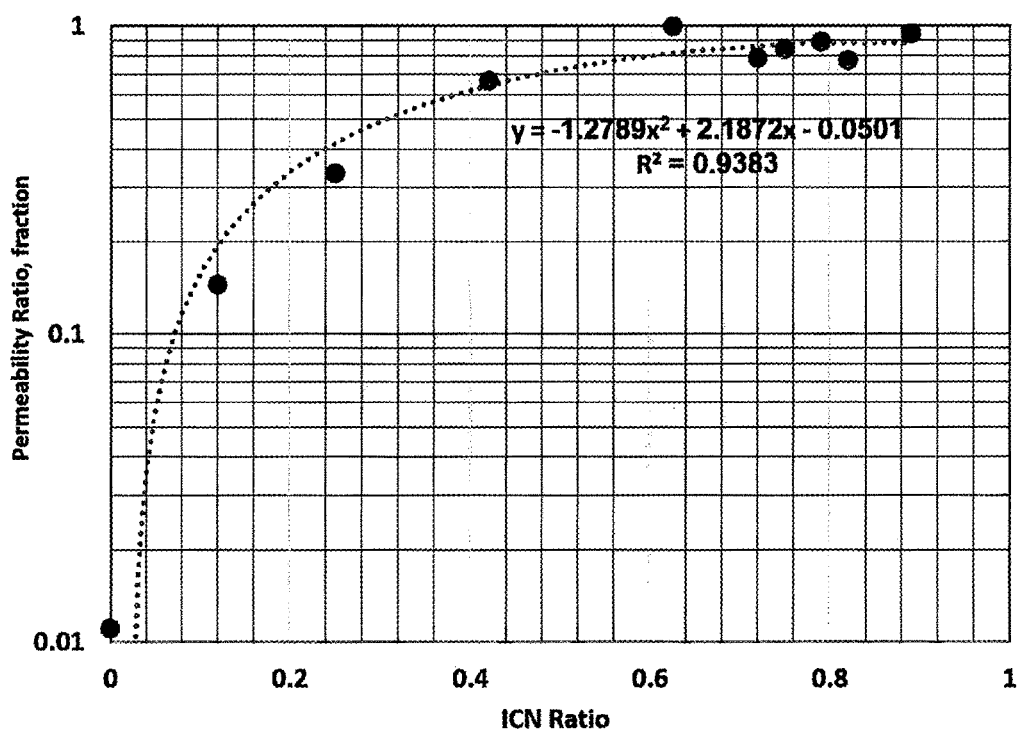
FIG. 13 is a calibration curve that correlates the interconnectivity number of a geological formation to a permeability ratio.

In a preferred embodiment, the second interconnectivity number is non-linearly correlated with a permeability ratio of the geological formation, as shown in FIG. 13. In view of that, the method further involves calculating the permeability ratio of the geological formation. The permeability ratio may be correlated with the permeability ratio via the following equation:

$$Y=Ax^2+Bx+C$$

wherein Y is the permeability ratio, x is the second interconnectivity number, A is a negative dimensionless number in the range of −2 to −1, preferably −1.5 to −1.1, preferably about −1.28; B is a positive dimensionless number in the range of 2-2.5, preferably about 2.18; and C is a negative dimensionless number in the range of −0.1 to −0.01, preferably −0.08 to −0.02, preferably about −0.05.

As used herein, the "permeability ratio" is a ratio of a permeability of the acidized geological formation to the permeability of the geological formation. In one embodiment, the stimulation fluid is the emulsified acid, as described, wherein the permeability ratio is in the range of 0.3-0.7, or 0.4-0.6. In another embodiment, the stimulation fluid is the acid solution, which contains 15 wt % of hydrochloric acid dissolved in seawater as described, wherein the permeability ratio is less than 0.2, or 0.05-0.15. In another embodiment, the stimulation fluid is the polymer-based gelled acid, as described, wherein the permeability ratio is less than 0.2, or 0.05-0.15. In still a further embodiment, the stimulation fluid is the VES-based gelled acid, as described, wherein the permeability ratio is in the range of 0.3-0.6, or 0.35-0.5. In some preferred embodiments, the stimulation fluid is the chelation-based fluid, as described, wherein the permeability ratio is in the range of 0.5-1.0, preferably 0.6-0.98, preferably 0.7-0.95.

According to a second aspect, the present disclosure relates to a method of determining an effectiveness of acidizing the geological formation. According to the method, once the first and the second interconnectivity numbers are calculated, the method further involves a step of comparing the first interconnectivity number with the second interconnectivity number to determine the effectiveness of acidizing the geological formation.

In one embodiment, comparing the first interconnectivity number with the second interconnectivity number is carried out by calculating an effectiveness number, which is a ratio of the second interconnectivity number to the first interconnectivity number. In terms of the present disclosure, the "effectiveness number" is a dimensionless number that determines an effectiveness of acidizing a geological formation. In view of that, when the effectiveness number is below unity, i.e. in the range of 0-1, the acidizing may preferably be characterized as "inefficient." When the effectiveness number is substantially equal to unity, the acidizing may be characterized as "fairly efficient." When, the effectiveness number is greater than unity, e.g. in the range of 1-10, or preferably 1-5, the acidizing may be characterized as "efficient." When, the effectiveness number is greater than 5, preferably greater than 10, e.g. in the range of 10-100, the acidizing may preferably be characterized as "very efficient."

The examples below are intended to further illustrate protocols for the method of acidizing the geological formation and the method of determining an effectiveness of the acidizing, and are not intended to limit the scope of the claims.

EXAMPLE 1—Materials and Experimental Work

In the following examples, coreflooding experiments were performed using 3-inch Indiana limestone cores at 100° C. at different injection rates of various stimulation fluids such as an emulsified acid, a hydrochloric (HCl) acid solution, a polymer-based gelled HCl acid, a viscoelastic surfactant (VES)-based gelled HCl acid, and chelating agents. Nuclear Magnetic Resonance (NMR) spectroscopy was used to evaluate the efficiency of different stimulation fluids in creating wormholes and the interconnectivity of the wormholes with the surrounding pores in the rock. The interconnectivity number is introduced to describe the interconnectivity between the created wormhole and the rest of the pores in the rock.

Eleven different stimulation fluids were tested at different injection rates. These fluids were prepared from their initial concentrations using either freshwater or seawater. In all coreflooding experiments the core initial permeability was measured using 3 wt. % KCl (potassium chloride), and also it was used as a pre- and post-flushing fluid.

Low permeability Indiana limestone core samples were used in all coreflooding experiments with an average permeability of 10 md and an average porosity of 15%. The mineralogical composition by XRD (X-Ray Diffractions) shows that the cores mainly consisted of 99.5 wt. % calcite and 0.5 wt. % quartz. All cores have 1.5-inch (3.81-cm) diameter and 3-inch (7.62-cm) length.

EXAMPLE 2—Interconnectivity Number

The interconnectivity number was used to describe and quantitatively characterize the interconnectivity between the generated wormholes and the pore structures in the rock. The higher the interconnectivity number, the better the quality of the generated wormhole. Stimulation fluids that yield high interconnectivity numbers were considered good stimulation fluids and considered as less damaging fluids. The interconnectivity number was estimated at the interconnection between the pore structures. The first one was calculated for the connection between micro and meso pores and the second one was calculated for the connection between meso and macro pores. The following equation was used to determine the interconnectivity number (ICN):

ICN=Intensity of the diffusion coupling/maximum intensity of the two pore structures The ICN ratio can be used when triple pore structures (micro/meso/macro pores) are present after acidizing the core samples. The ICN ratio can be determined as follows:

$$ICN_{Ratio} = ICN_{micro/meso}/ICN_{meso/macro}$$

where $ICN_{micro/meso}$ is the interconnectivity number between micro and meso pores and $ICN_{meso/macro}$ is the interconnectivity number between meso and macro pores.

For example, using the NMR data in FIG. 1 (in the after acidizing curve), the interconnectivity number between micro and meso pores is equal to 0.075/0.12=0.625 or 62.5%. The intensity of the diffusion coupling between the micro and macro pores is 0.075 and the maximum intensity of the two pore structures (in this case micro pores have the highest intensity) is 0.12. The interconnectivity number between meso and macro pores is equal to 0.07/0.225=0.31 or 31%. To assess the quality of the stimulation fluid in wormhole generation the ratio between the two numbers was used. The ICN between micro-meso pores will be divided by that between meso-macro pores. The higher the number, the good the interconnectivity between the pore structures and the less damaging the stimulation fluid is. For the core plug in FIG. 1 that was stimulated by 15 wt. % HCl prepared in freshwater at 2 cm³/min, the ratio is 2. The ICN for the core in FIG. 2 (the one treated by 15 wt. % HCl prepared in seawater at 2 cm³/min) was zero between the micro and meso pores and it was 0.4 between meso and macro pores (ICN=0.18/0.45=0.4). The ratio between the two numbers is zero. This ratio is a good measure for the formation damage associated with the stimulation fluid. Only NMR can capture this phenomenon, which cannot be characterized by CT scan and pressure drop. According to that, NMR is found to be an advantageous tool besides mercury injection capillary pressure (MICP) that can provide information about interconnection of pore structures in a formation.

EXAMPLE 3—Stimulation of Indiana Limestone Cores Using Retarded/Gelled HCl

The composition of the stimulation fluids that are used in this study are listed in Table 1. Systems 3, 4, and 5 are VES-based gelled HCl, polymer-based gelled HCl, and emulsified acid, respectively. In this part the focus will be on the NMR evaluation of the generated wormholes because as mentioned earlier other methods such as pressure drop and CT scans cannot capture the full details of the wormholes. The three acid systems were evaluated extensively in the literature and their diversion ability was confirmed in carbonate acidizing.

TABLE 1

Stimulation fluids used in this study.

| No. | Fluid | Conc. wt. % | Base | Composition |
|---|---|---|---|---|
| 1 | HCl | 15 | Freshwater | 15 wt. % HCl + 0.4 vol. % corrosion inhibitor (CI) |
| 2 | HCl | 15 | Seawater | 15 wt. % HCl + 0.4 vol. % CI |
| 3 | VES-based gelled HCl | 15 | Freshwater | 15 wt. % HCl, 4 wt. % VES, 0.3 vol. % CI |
| 4 | Polymer-based gelled HCl | 5 | Freshwater | 5 wt. % HCl, 0.5 wt. % co-polymer, 0.4 vol. % CI + 0.45 vol. % crosslinker (FeCl₃) + 0.25 vol. % beaker (sodium erythorbate) |
| 5 | Emulsified acid | 15 | Freshwater | 15 wt. % HCl (70 vol. %) + diesel (30 vol. %) + 0.3 vol. % CI |
| 6 | EDTA | 20 | Freshwater | 20 wt. % EDTA in freshwater, pH = 4 |
| 7 | EDTA | 20 | Seawater | 20 wt. % EDTA in seawater, pH = 4 |
| 8 | HEDTA | 20 | Freshwater | 20 wt. % HEDTA in freshwater, pH = 4 |
| 9 | HEDTA | 20 | Seawater | 20 wt. % HEDTA in seawater, pH = 4 |
| 10 | GLDA | 20 | Freshwater | 20 wt. % GLDA in freshwater, pH = 4 |
| 11 | GLDA | 20 | Seawater | 20 wt. % GLDA in seawater, pH = 4 |

Figure 3:
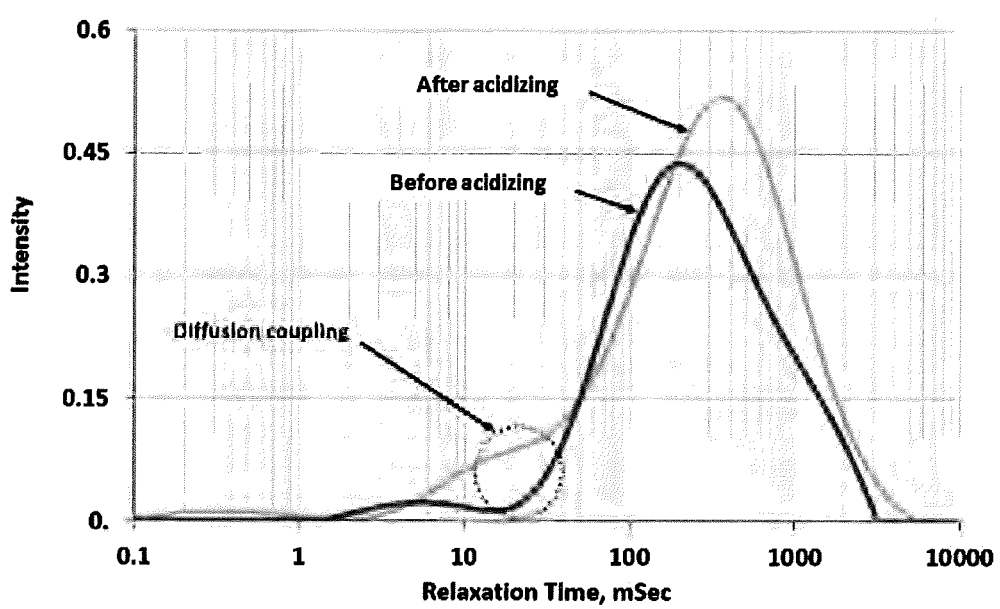
FIG. 3 represents NMR spectra of a geological formation over the micro-pore relaxation range, the meso-pore relaxation range, and the macro-pore relaxation range before and after an acidizing operation, wherein the geological formation is acidized with an emulsified acid at a flow (injection) rate of 2 cm$^3$/min.

FIG. 3 shows the NMR profile for the core treated by emulsified acid at 2 cm³/min. Emulsified acid did not cause damages, while connected the pores. The wormhole generation enlarged the existing macro pores and also the acid leak off in the core enlarged the existing micro pores and enhanced the interconnectivity between the two pore structures: The interconnectivity number (ICN) was 0.02/0.45=4.5% before acid stimulation and increased to 0.1/0.5=20% after treating the core by emulsified acid.

Figure 4:
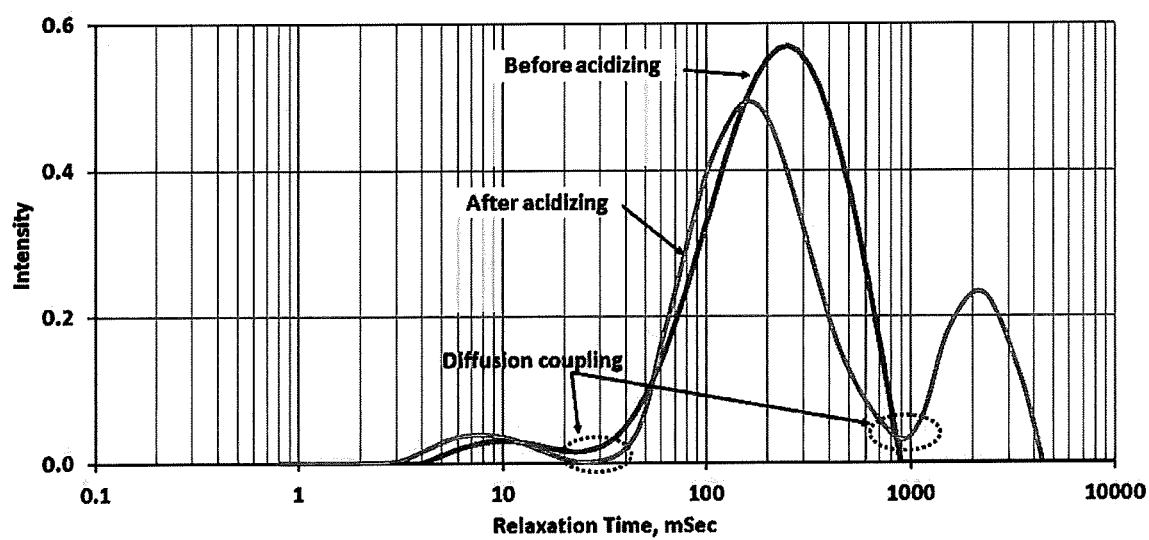
FIG. 4 represents NMR spectra of a geological formation over the micro-pore relaxation range, the meso-pore relaxation range, and the macro-pore relaxation range before and after an acidizing operation, wherein the geological formation is acidized with a polymer-based gelled acid at a flow (injection) rate of 2 cm$^3$/min.

FIG. 4 shows the NMR profiles before and after stimulating the core using the polymer-based gelled HCl. This stimulation fluid has strong diversion ability and it created larger wormholes and the acid leak off also enlarged other pores in the rock. Polymer-based gelled HCl has high molecular weight and it gets adsorbed and retained in the interconnection of the different pore structures. The polymer residue completely plugged the interconnection between the micro and meso pores and this resulted in ICN of zero. The ICN between the meso and macro pores is 0.03/0.55=5.5% and the ratio between the two ICN's is zero. This acid system created wormholes and diverted the fluid efficiently but the created wormholes are not well-connected to the other pore structures in the rock. The created wormhole is completely isolated from the micro pores and has small interconnectivity with the meso pores and this will result is inefficient acid treatment using this type of acids.

Figure 5:
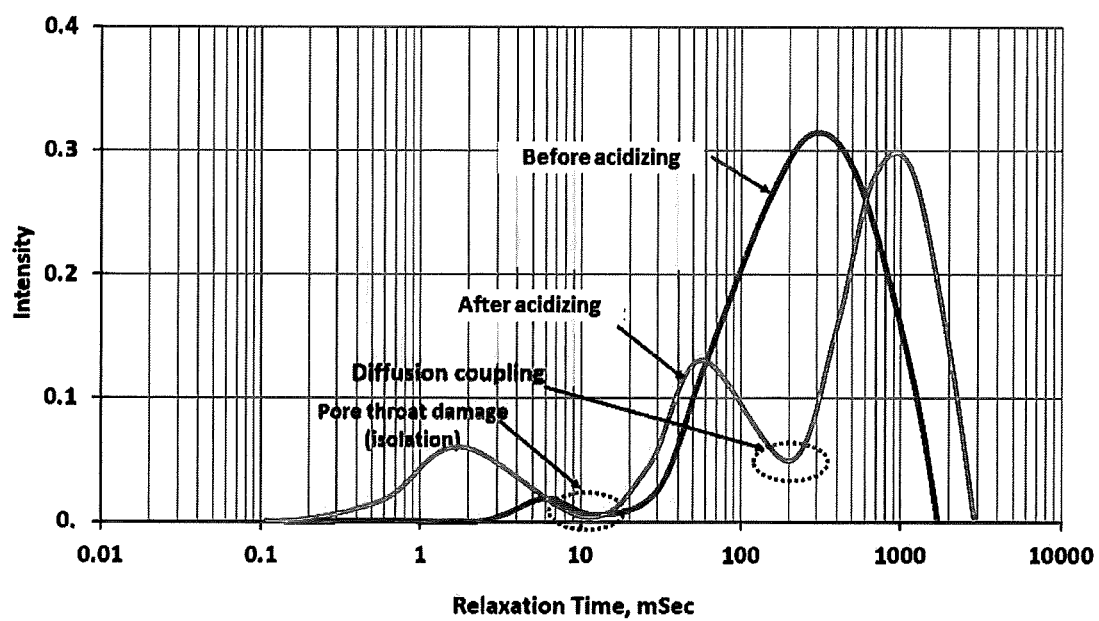
FIG. 5 represents NMR spectra of a geological formation over the micro-pore relaxation range, the meso-pore relaxation range, and the macro-pore relaxation range before and after an acidizing operation, wherein the geological formation is acidized with a VES-based gelled acid at a flow (injection) rate of 2 cm$^3$/min.

FIG. 5 shows the NMR profiles before and after treating the core using VES-based gelled HCl. The VES acid system has good diversion ability and it is less damaging than polymer-based gelled HCl. VES surfactants have smaller molecular weight and their retention will be smaller compared to polymers. VES generally adsorb on the carbonate rocks and plugs smaller pores and pore throats in the carbonate rocks. The wormholes that are generated after acidizing the rocks with VES-based gelled HCl has a relaxation time of 3000 msec compared to the initial relaxation time of 1750 msec. The interconnectivity number (ICN) between the micro and meso pores is 0.01/0.13=0.077 (7.7%). The ICN between the meso and macro pores (wormhole) is 0.055/0.3=0.183 (18.3%). The ratio between the two ICN is 0.42 (42%). In view of these results, the VES-based gelled HCl is a better stimulation fluid than polymer-based gelled HCl in the diversion process because it causes less damage to the pore interconnectivity. According to the coreflooding experiments, the preferred injection rate of VES-based gelled HCl was found to be about 2 cm$^3$/min.

In this study, a different approach was used to determine a preferred injection rate. The preferred injection rate is an injection rate that yields the highest wormhole interconnectivity with the pore structures of the rock (i.e. the highest ICN ratio). Four different coreflooding experiments were carried out using Indiana limestone rocks at 100° C. at 1, 2, 4, and 6 cm$^3$/min injection rates. The ICN was determined between the micro and meso pores and also between the meso and macro (wormholes) pores. The ratio of the $ICN_{micro-meso}$ to $ICN_{meso-wormhole}$ was plotted versus the injection rate. The injection rate that provided the highest ICN was taken as the preferred injection rate.

FIG. 7 shows the new approach followed in this study to determine the preferred injection rate for the WS-based gelled HCl. The NMR showed that, the generated wormhole is not well-connected to the rest of the pores in the rock as indicated by the value of ICN, 18.3%. FIG. 7 shows that the preferred injection rate is 3 cm$^3$/min because it resulted in 42% ICN ratio. This rate resulted in the creation of wormholes that are well-connected with the rest of the pores in the rock leading to higher stimulation efficiency with this acid system. The preferred injection rate of 3 cm$^3$/min resulted in a successful stimulation treatment compared to the injection rate of 2 cm$^3$/min that resulted in an ICN ratio of 29 compared to 42 in the case of 3 cm$^3$/min. By defining the preferred injection rate as being the highest ICN ratio, the damage that may result from the precipitation during stimulation operations may disappear. As indicated earlier dominant channels and wormholes may initially be present in the rocks, but they may not be connected with the pore networks that contain formation fluids. For example, precipitations on the wormhole surface may plug the connection between the created wormhole and other pores in the rock.

The conventional definition of the preferred injection rate is based on locating the rate at which the least amount of acid is needed to create a dominant wormhole. This definition does not consider the quality of the wormhole and its connectivity with the surrounding pores. The definition of interconnectivity number of the present disclosure is based on fluid connectivity between the created wormholes and the surrounding pore structures in the rock. The conventional definition considered only the creation of the wormhole regardless it is connected or with the rock or not. In view of that, wormholes may be generated, but the walls of these wormholes may be completely plugged by the reaction products, thus the wormholes do not allow formation fluids to flow into the wormholes. Assessing the wormhole generation based on the interconnectivity number can help one of ordinary skill in the art to select the best acid and to determine the preferred injection rate.

Similar results were obtained for the emulsified acid system as shown in FIG. 8. In this case higher ICN ratio was obtained compared to the VES-based gelled HCl because the emulsified acid is less damaging compared to VES-based gelled HCl. VES is adsorbed inside the rock and plugs the interconnections between the pores. Emulsified acid is gentle to the rock, thus it yielded an ICN ratio of 52% compared to 42% in the case of VES-based gelled HCl.

FIG. 9 shows a preferred injection rate of 3 cm$^3$/min from the coreflooding experiments and 4 cm$^3$/min from the ICN ratio plot for the in-situ polymer-based gelled HCl. This system was reported to be very damaging during carbonate acidizing [Gomaa, A. M., Mahmoud, M. A., and Nasr-El-Din, H. A., Laboratory Study of Diversion Using Polymer-Based In-Situ-Gelled Acids. SPE Production & Operations Journal 26(3), 2011, 278-290, doi:10.2118/132535-PA; incorporated herein by reference in its entirety]. The values of ICN ratio were very small compared to VES-based gelled HCl and emulsified acid systems. The maximum ICN ratio obtained with this system at the preferred injection rate was 17.5% compared to 52% for the emulsified acid. As reported in the literature this is attributed to the polymer residue around the wormholes that reduces the interconnectivity between the wormhole and the pores in the rock.

FIG. 10 shows the results of EDTA, HEDTA, and GLDA chelating agents. The behavior of the three chelates is very similar in both pore volumes to breakthrough and ICN ratio plots. The pore volume to breakthrough shows a preferred injection rate between 1 and 2 cm$^3$/min. The ICN ratio shows an preferred injection rate of 2 cm$^3$/min. Chelating agents yielded higher ICN ratio compared to the previous HCl-based acid system because they are compatible with both fluids and rock and do not cause precipitation. The three chelates yielded ICN ratio greater than 80%.

EXAMPLE 4—Stimulation of Indiana Limestone Cores Using Chelating Agents

Three different chelating agents were used namely; EDTA, HEDTA, and GLDA to form a chelation-based stimulation fluid. The concentration was fixed at 20 wt. % and the pH was 4 and all experiments were performed at 100° C. Each chelating agents was diluted in both freshwater and seawater.

FIG. 6 shows the NMR profiles for the Indiana limestone core treated by 20 wt. % EDTA chelating agent diluted in freshwater. Initially the core had two pore structures, micro and macro pores, and the two pore structures were disconnected. After the treatment, EDTA created a third pore structures and enhanced the connectivity between the three pore structures. The ICN between the micro and meso pores is 0.09/0.27 or 0.33, and the ICN between the meso pores and wormholes (macro pores) is 0.37. The ratio between the two ICN is 89% which is very high. This means EDTA created very well connected wormhole without causing any damage to the rock. Similar experiment was conducted using 20 wt. % EDTA diluted in seawater at the same conditions.

FIG. 11 shows the summary of different coreflooding experiments performed for 20 wt % chelating agents diluted in both freshwater and seawater. Chelating agents prepared in seawater did not adversely affect the interconnectivity between the pores and the created wormholes. All the tested chelation-based stimulation fluids revealed high ICN ratios, indicating that chelating agents when diluted in freshwater or seawater can be effectively used to stimulate carbonate reservoirs compared to HCl acid solutions that may form precipitations around the wormholes, particularly when prepared in seawater.

Figure 12:
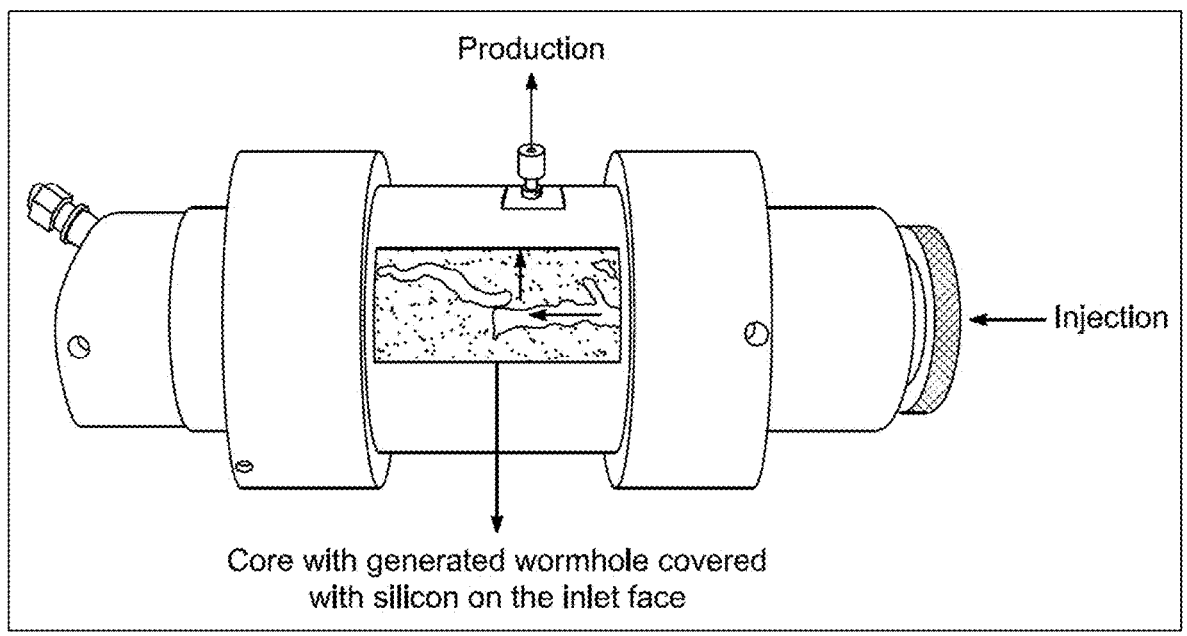
FIG. 12 is an image of a core holder that is used for coreflooding experiments.

EXAMPLE 5—Relationship Between Core Permeability after Stimulation and Interconnectivity Number The core permeability at the wormhole wall was measured using the core holder shown in FIG. 12. The 3 wt % KCl was injected into the created wormhole and the production was allowed from the indicated port only. The permeability was measured for different cores treated with different acid systems and the ICN number ratio was determined using the NMR for the created wormholes. The connection between the pore structures in the rock and the wormhole was also investigated.

FIG. 13 shows a strong relation between the ICN ratio and the permeability ratio of the core, which is a ratio of the permeability after acid-treatment to an initial permeability of the core. The permeability ratio approaches to unity when the stimulation fluid does not damage the pore connectivity of the core. Also the permeability ratio approaches to zero when the pore connectivity of the core is completely plugged, and no fluid pathway is found between the generated wormhole and the pore structures of the core. As shown in FIG. 13, low ICN ratio is associated with low permeability ratio (measured permeability/initial core permeability). High ICN ratio means good connectivity between the pores and the wormhole and in turn, good flow path and high permeability.

Detailed NMR scanning of the core was found to be a good assessing tool for the type of the stimulation fluid and locating the created wormholes. For example, using a 3-inch length Indiana limestone core, conventional coreflooding experiments showed that 2 cm$^3$/min injection rate generates the minimum acid volume VES-based gelled HCl, however, NMR scan showed an injection rate of 3 cm$^3$/min generates the highest pore interconnectivity for the wormhole. Gelled acidizing fluids such as HCl based on polymers created wormholes that were clearly identified by CT scan and pressure drop but the NMR scan showed that these wormholes are completely isolated from the rest of the surrounding pore structures due to polymer residue plugging the pores. This isolation will reduce the production rate due to minimal radial fluid entry at the wormhole surface. Radial flooding experiments through the wormhole and production from the side of the core confirmed the findings of NMR scan regarding the interconnection between the wormholes and other pores in the rock. Strong relationship was found between the interconnectivity number and core radial permeability around the wormhole.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A method of acidizing a geological formation surrounding a wellbore, comprising:
    recording a first nuclear magnetic resonance (NMR) spectrum of a portion of the geological formation over a micro-pore relaxation range, a meso-pore relaxation range, and a macro-pore relaxation range;
    calculating a first interconnectivity number by dividing a first micro-meso interconnectivity number to a first meso-macro interconnectivity number, wherein the first micro-meso interconnectivity number is a ratio of an intensity of the first NMR spectrum at a micro-meso diffusional coupling to a peak intensity of the first NMR spectrum in the micro-pore relaxation range or the meso-pore relaxation range, and the first meso-macro interconnectivity number is a ratio of an intensity of the first NMR spectrum at a meso-macro diffusional coupling to a peak intensity of the first NMR spectrum in the meso-pore relaxation range or the macro-pore relaxation range;
    acidizing the geological formation by delivering a first stimulation fluid to the portion of the geological formation, thereby forming an acidized geological formation;
    recording a second NMR spectrum of the acidized geological formation over the micro-pore relaxation range, the meso-pore relaxation range, and the macro-pore relaxation range;
    calculating a second interconnectivity number by dividing a second micro-meso interconnectivity number to a second meso-macro interconnectivity number, wherein the second micro-meso interconnectivity number is a ratio of an intensity of the second NMR spectrum at a micro-meso diffusional coupling to a peak intensity of the second NMR spectrum in the micro-pore relaxation range or the meso-pore relaxation range, and the second meso-macro interconnectivity number is a ratio of an intensity of the second NMR spectrum at a meso-macro diffusional coupling to a peak intensity of the second NMR spectrum in the meso-pore relaxation range or the macro-pore relaxation range; and
    re-acidizing the acidized geological formation by delivering a second stimulation fluid to the wellbore at a predetermined flow rate.

2. The method of claim 1,
    wherein the first interconnectivity number determines a fluid connectivity between pore structures of the geological formation, and
    wherein the second interconnectivity number determines a fluid connectivity between pore structures of the acidized geological formation.

3. The method of claim 1, wherein the second interconnectivity number is non-linearly correlated with a permeability ratio of the geological formation, and the method further comprising:
    calculating the permeability ratio of the geological formation, wherein the permeability ratio is a ratio of a permeability of the acidized geological formation to the permeability of the geological formation.

4. The method of claim 1, wherein the geological formation is a carbonate formation with a permeability of 1 to 50 millidarcy.

5. The method of claim 1, wherein the geological formation has a porosity of 5-50%.

6. The method of claim 1,
    wherein acidizing the geological formation is carried out at a temperature of 80-120° C., and
    wherein re-acidizing the acidized geological formation is carried out at a temperature of 80-120° C.

7. The method of claim 1,
    wherein the first stimulation fluid has a pH of 1-6, and
    wherein the second stimulation fluid has a pH of 1-6.

8. The method of claim 1, wherein the second stimulation fluid is a chelation-based fluid that comprises 10-30 wt % of at least one chelating agent selected from the group consisting of ethylenediamine tetraacetic acid (EDTA), hydroxyethylenediamine triacetic acid (HEDTA), and glutamic diacetic acid (GLDA), relative to the total weight of the second stimulation fluid.

9. The method of claim 8, wherein the second interconnectivity number is 0.7-1.0.

10. The method of claim 1,
wherein the second stimulation fluid is an emulsified acid that comprises at least one mineral acid selected from the group consisting of hydrochloric acid, hydrofluoric acid, hydrobromic acid, hydroiodic acid, nitric acid, sulfuric acid, phosphoric acid, perchloric acid, and boric acid, and
wherein the second interconnectivity number is 0.4-0.6.

11. The method of claim 1,
wherein the second stimulation fluid is an acid solution that comprises 10-20 wt % of at least one mineral acid in freshwater, relative to the total weight of the second stimulation fluid, and
wherein the at least one mineral acid is selected from the group consisting of hydrochloric acid, hydrofluoric acid, hydrobromic acid, hydroiodic acid, nitric acid, sulfuric acid, phosphoric acid, perchloric acid, and boric acid.

12. The method of claim 1, wherein the wellbore is a vertical wellbore, a horizontal wellbore, or a multi-lateral wellbore.

13. The method of claim 1, wherein at least one wormhole is formed in the geological formation after the acidizing.

14. The method of claim 1, wherein the first and the second NMR spectra are recorded with an NMR-logging tool.

15. The method of claim 1, wherein the predetermined flow rate is determined from a calibration curve that correlates the second interconnectivity number to a flow rate of the first stimulation fluid.

16. The method of claim 1,
wherein the second stimulation fluid is a chelation-based fluid that comprises 10-30 wt % of at least one chelating agent selected from the group consisting of EDTA, HEDTA, and GLDA, relative to the total weight of the second stimulation fluid, and
wherein the predetermined flow rate is 1-4 $cm^3$/min.

17. A method of determining an effectiveness of acidizing a geological formation, the method comprising:
recording a first nuclear magnetic resonance (NMR) spectrum of the geological formation over a micro-pore relaxation range, a meso-pore relaxation range, and a macro-pore relaxation range;
calculating a first interconnectivity number by dividing a first micro-meso interconnectivity number to a first meso-macro interconnectivity number, wherein the first micro-meso interconnectivity number is a ratio of an intensity of the first NMR spectrum at a micro-meso diffusional coupling to a peak intensity of the first NMR spectrum in the micro-pore relaxation range or the meso-pore relaxation range, and the first meso-macro interconnectivity number is a ratio of an intensity of the first NMR spectrum at a meso-macro diffusional coupling to a peak intensity of the first NMR spectrum in the meso-pore relaxation range or the macro-pore relaxation range;
acidizing the geological formation by delivering a stimulation fluid to the wellbore, thereby forming an acidized geological formation;
recording a second NMR spectrum of the acidized geological formation over the micro-pore relaxation range, the meso-pore relaxation range, and the macro-pore relaxation range;
calculating a second interconnectivity number by dividing a second micro-meso interconnectivity number to a second meso-macro interconnectivity number, wherein the second micro-meso interconnectivity number is a ratio of an intensity of the second NMR spectrum at a micro-meso diffusional coupling to a peak intensity of the second NMR spectrum in the micro-pore relaxation range or the meso-pore relaxation range, and the second meso-macro interconnectivity number is a ratio of an intensity of the second NMR spectrum at a meso-macro diffusional coupling to a peak intensity of the second NMR spectrum in the meso-pore relaxation range or the macro-pore relaxation range; and
comparing the first interconnectivity number with the second interconnectivity number to determine the effectiveness of acidizing the geological formation.

18. The method of claim 17, wherein the second interconnectivity number is non-linearly correlated with a permeability ratio of the geological formation, and the method further comprising:
calculating the permeability ratio of the geological formation, wherein the permeability ratio is a ratio of a permeability of the acidized geological formation to the permeability of the geological formation.

19. The method of claim 18, wherein the stimulation fluid is a chelation-based fluid that comprises 10-30 wt % of at least one chelating agent selected from the group consisting of ethylenediamine tetraacetic acid (EDTA), hydroxyethylenediamine triacetic acid (HEDTA), and glutamic diacetic acid (GLDA), relative to the total weight of the stimulation fluid.

20. The method of claim 19, wherein the permeability ratio is 0.5-1.0.

* * * * *